(12) United States Patent
Kimura et al.

(10) Patent No.: US 10,689,543 B2
(45) Date of Patent: Jun. 23, 2020

(54) AQUEOUS POLYHYDROXYURETHANE RESIN DISPERSION, METHOD FOR PRODUCING SAID AQUEOUS DISPERSION, GAS-BARRIER RESIN FILM PRODUCED USING SAID AQUEOUS DISPERSION, AQUEOUS POLYHYDROXYURETHANE RESIN DISPERSION COMPOSITION CONTAINING CLAY MINERAL, GAS-BARRIER COATING AGENT COMPRISING SAID COMPOSITION, AND GAS-BARRIER RESIN FILM

(71) Applicant: DAINICHISEIKA COLOR & CHEMICALS MFG. CO., LTD., Tokyo (JP)

(72) Inventors: Kazuya Kimura, Tokyo (JP); Kenichi Takahashi, Tokyo (JP); Manabu Uruno, Tokyo (JP); Kazuaki Muto, Tokyo (JP); Masashi Tanigawa, Tokyo (JP); Akiko Minami, Tokyo (JP)

(73) Assignee: DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 0 days.

(21) Appl. No.: 16/342,882

(22) PCT Filed: Oct. 30, 2017

(86) PCT No.: PCT/JP2017/039046
§ 371 (c)(1),
(2) Date: Apr. 17, 2019

(87) PCT Pub. No.: WO2018/084102
PCT Pub. Date: May 11, 2018

(65) Prior Publication Data
US 2019/0338160 A1    Nov. 7, 2019

(30) Foreign Application Priority Data

Nov. 2, 2016 (JP) .................................. 2016-215677
Nov. 2, 2016 (JP) .................................. 2016-215678

(51) Int. Cl.
*C09D 175/12* (2006.01)
*C08G 71/04* (2006.01)
(Continued)

(52) U.S. Cl.
CPC ........... *C09D 175/12* (2013.01); *C08G 71/04* (2013.01); *C08J 7/048* (2020.01); *C08K 3/346* (2013.01); *C09D 5/00* (2013.01); *C09D 7/61* (2018.01)

(58) Field of Classification Search
CPC ....... C08K 3/346; C08G 71/04; C09D 175/12
See application file for complete search history.

(56) References Cited

U.S. PATENT DOCUMENTS 3,072,613 A   1/1963   Whelan et al.
5,175,231 A   12/1992  Rappoport et al.
(Continued)

FOREIGN PATENT DOCUMENTS

JP   06-025409      2/1994
JP   2006-009001    1/2006
(Continued)

OTHER PUBLICATIONS

International Search Report, issued in the corresponding PCT application No. PCT/JP2017/039046, dated Jan. 23, 2018, 5 pages.
(Continued)

*Primary Examiner* — Ramsey Zacharia
(74) *Attorney, Agent, or Firm* — Hamre, Schumann, Mueller & Larson, P.C.

(57) ABSTRACT

An aqueous polyhydroxyurethane resin dispersion, which can be stored for a long time, and with which a coating film
(Continued)

having a high gas-barrier property can be formed; an aqueous dispersion composition containing a complex of the resin and a clay mineral; and a film having a high gas-barrier property produced using the aqueous polyhydroxyurethane resin dispersion or the aqueous dispersion composition are provided. The aqueous polyhydroxyurethane resin dispersion comprises a polyhydroxyurethane resin finely dispersed in water, where the polyhydroxyurethane resin has in its structure, a repeating unit represented by formula (1) as a basic structure and a carboxyl group-containing chemical structure moiety represented by formula (6), described in this specification. The aqueous dispersion composition comprising the polyhydroxyurethane resin and a layered clay mineral form composite. The film having a high gas-barrier is produced using the aqueous dispersion or the aqueous dispersion composition.

12 Claims, 1 Drawing Sheet

(51) Int. Cl.
  *C08K 3/34*   (2006.01)
  *C09D 7/61*   (2018.01)
  *C09D 5/00*   (2006.01)
  *C08J 7/048*  (2020.01)

(56) References Cited

U.S. PATENT DOCUMENTS

| | | | |
|---|---|---|---|
| 9,464,209 | B2 | 10/2016 | Dudik et al. |
| 2009/0312502 | A1* | 12/2009 | Bernard ................ C08G 71/04 525/458 |
| 2013/0323491 | A1* | 12/2013 | Takahashi ............. C08J 7/047 428/220 |

FOREIGN PATENT DOCUMENTS

| | | |
|---|---|---|
| JP | 2007-297544 | 11/2007 |
| JP | 2011-102005 | 5/2011 |
| JP | 2012-172144 | 9/2012 |
| JP | 2012-236925 | 12/2012 |
| JP | 2015-007197 | 1/2015 |
| JP | 2016-194029 | 11/2016 |
| JP | 2016-204592 | 12/2016 |

OTHER PUBLICATIONS

Indian Examination Report, issued in the corresponding Indian patent application No. 201917020062, dated Mar. 20, 2020, 5 pages.
Extended European Search Report, issued in the corresponding European patent application No. 17867669.8, dated Apr. 24, 2020, 9 pages.

* cited by examiner

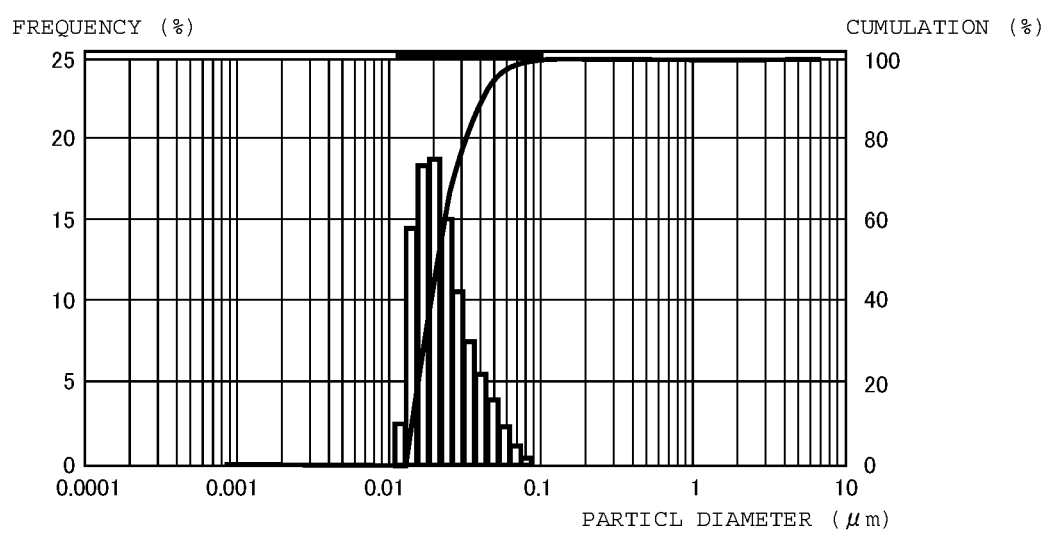

AQUEOUS POLYHYDROXYURETHANE RESIN DISPERSION, METHOD FOR PRODUCING SAID AQUEOUS DISPERSION, GAS-BARRIER RESIN FILM PRODUCED USING SAID AQUEOUS DISPERSION, AQUEOUS POLYHYDROXYURETHANE RESIN DISPERSION COMPOSITION CONTAINING CLAY MINERAL, GAS-BARRIER COATING AGENT COMPRISING SAID COMPOSITION, AND GAS-BARRIER RESIN FILM

TECHNICAL FIELD

The present invention relates to a novel aqueous polyhydroxyurethane resin dispersion which can be utilized in a wide range as a binder resin for paints and coating agents and which has excellent stability. The present invention also relates to a technique on an aqueous dispersion composition which can be utilized in a wide range as a binder resin for paints and coating agents and which has achieved making a favorable composite of a polyhydroxyurethane resin and a clay mineral. More specifically, the present invention relates to a technique by which highly environment-friendly products can be provided because the technique can be suitably used for aqueous dispersion paint materials because of giving excellent stability and can incorporate carbon dioxide in a chemical structure of a polyhydroxyurethane resin. The present invention also relates to a technique which provides an aqueous polyhydroxyurethane resin dispersion or an aqueous dispersion composition being a composite of a polyhydroxyurethane resin and a clay mineral, the aqueous polyhydroxyurethane resin dispersion or the aqueous dispersion composition exhibiting paint film applicability comparable to that of paint films formed with conventional solvent-based paints in terms of functionalities of a formed coating film, and enabling realization of formation of a coating film exhibiting a more excellent gas-barrier property.

BACKGROUND ART

A polyurethane resin is a resin having excellent strength, flexibility, wear resistance, and oil resistance, and is widely used as a resin for paints and adhesives. In recent years, a polyhydroxyurethane resin having a urethane bond and a hydroxy group together in the chemical structure thereof has been developed as a novel polyurethane-based resin, and industrial applications thereof are expected (see Patent Literature 1). Existing polyurethane resins are obtained using an isocyanate compound and a polyol as raw materials, while the polyhydroxyurethane resin is produced using an epoxy compound, carbon dioxide, and an amine compound as raw materials and combining these raw materials. Carbon dioxide used as a raw material is incorporated into the chemical structure of the polyhydroxyurethane resin as a —CO—O— bond, and therefore the polyhydroxyurethane resin is a resin material to which attention should be paid also from the viewpoint of effective utilization of carbon dioxide being a greenhouse gas.

The polyhydroxyurethane resin as well as the existing polyurethane resins can be made into a resin having excellent mechanical properties, and further, applications making the best use of functionalities derived from a hydroxy group which does not exist in the structures of the existing polyurethane resins have been studied. For example, an application as a heat-resistant paint utilizing crosslinking reaction of the hydroxy group (see Patent Literature 2) and an application to a gas-barrier film utilizing a gas-barrier property derived from the hydroxy group have been studied (see Patent Literature 3).

As found in these conventional techniques, the field of paints and the field of coating are promising as the application use of polyhydroxyurethane resins. However, polyhydroxyurethane resins which have so far been developed each contain a chemical structure having a hydroxy group together with a urethane bond and therefore have a low solubility to organic solvents, so that there are many cases where the solubility is different depending on the base material and the processing apparatus used in each use and there has been a problem in practical use in that it is difficult to adapt a polyhydroxyurethane resin to various solvent compositions. To deal with this problem, making a polyhydroxyurethane resin into an aqueous dispersion, thereby solving this problem, and applying the polyhydroxyurethane resin to water-based paints, with which solvent-based paints have been replaced in recent years, have been studied and are proposed (see Patent Literature 4). In addition, as another method, a method for obtaining a polyhydroxyurethane resin having a carboxyl group using a carboxylic acid-containing amine compound as a raw material is proposed (see Patent Literature 5).

In addition, as a method for improving the gas-barrier property of a polyhydroxyurethane resin, a method for making a composite with a clay mineral is proposed (Patent Literature 6). Generally, to disperse a clay mineral in a resin, a hydrophobization treatment such as replacing an interlayer metal cationic ion with an organic onium salt is needed, and in the conventional techniques described above, a clay mineral is subjected to a hydrophobization treatment and is thereafter made into a composite.

CITATION LIST

Patent Literature

Patent Literature 1: U.S. Pat. No. 3,072,613
Patent Literature 2: Japanese Patent Laid-Open No. 2011-102005
Patent Literature 3: Japanese Patent Laid-Open No. 2012-172144
Patent Literature 4: Japanese Patent Laid-Open No. 2007-297544
Patent Literature 5: Japanese Patent Laid-Open No. 6-25409
Patent Literature 6: Japanese Patent Laid-Open No. 2015-007197

SUMMARY OF INVENTION

Technical Problem

However, according to studies conducted by the present inventors, there have been problems to be solved, as described below, in the above described techniques of making a polyhydroxyurethane resin into an aqueous system. The technique described in Patent Literature 4 converts a hydroxy group of a polyhydroxyurethane resin into a carboxyl group by a half ester method in order to obtain an aqueous dispersion, therefore has left a problem in that the storage stability of the aqueous dispersion is poor because of hydrolysis of a half ester part, and has not solved the problem completely. In addition, reducing the hydroxy group of the polyhydroxyurethane resin by utilizing the hydroxy group in the reaction in the technique has an advantage of contributing to improving the water resistance, but on the other hand, there is a problem that this reduction of the hydroxy group becomes a drawback in uses in which the functionalities of the hydroxy group in the structure are utilized.

In addition, in the technique described in Patent Literature 5, there is a problem that the carboxyl group and the amino group form an ion bond in the synthesis reaction system and it is hard for the reaction with a cyclic carbonate to progress, and there is also a problem that the reaction in a high-boiling point solvent such as DMF (dimethylformamide) is needed and increasing the molecular weight is difficult. Further, there is also a problem that the high-boiling point solvent used in the technique described in Patent Literature 5 cannot be distilled away under reduced pressure after phase-transfer emulsification, and therefore it is difficult to say that the technique described in Patent Literature 5 is perfect as a method for producing an aqueous dispersion (emulsion).

Accordingly, the first object of the present invention is to provide an aqueous polyhydroxyurethane resin dispersion which can be used as a resin for forming a coating film in water-based paints and coating agents, which solves the problems which occurs in the conventional techniques in the case where a polyhydroxyurethane resin is utilized as an aqueous dispersion, which can be put into practical use, and which exhibits favorable stability. Moreover, the first object of the present invention is to provide, in addition to the solution to the above-described problems, an aqueous polyhydroxyurethane resin dispersion by which a resin film having a more excellent gas-barrier property can be provided.

Further, there is a problem that the conventional method, which is described in Patent Literature 6, of making a composite with a clay mineral in order to improve the gas-barrier property of the polyhydroxyurethane resin needs a complicated step for performing a hydrophobization treatment of the clay mineral. In addition, according to studies conducted by the present inventors, part of the organic onium salt used for the hydrophobization treatment inhibits crystallization of a resin and can be a factor of lowering the gas-barrier property. Therefore, if an unmodified clay mineral can be made into a composite with a resin in a water solvent in which the unmodified clay mineral can be dispersed, it is considered to be preferable for exhibiting the gas-barrier property. However, according to studies conducted by the present inventors, a clay mineral can be used in an unmodified state in making a composite in water, but in the case where a resin having an anionic group is used in order to disperse an aqueous resin in making a composite, the anionic group and an anionic ion at the surface of the clay mineral have repulsion and the dispersion state becomes unstable. To deal with this problem, in Japanese Patent Laid-Open No. 2005-139436 for example, addition of a cationic component as a third component in obtaining an aqueous dispersion of a polyurethane resin having a carboxyl group is proposed. However, it cannot be said that such addition of a third component is an effective method because the third component inhibits the crystallization of a resin, which is similar to the above-described case where an organic onium salt is used.

Accordingly, the second object of the present invention is to provide an aqueous dispersion composition which can be used as a resin for forming a coating film in water-based paints and coating agents, which overcomes the problems of the conventional techniques in the case where a polyhydroxyurethane resin is utilized, which realizes making a favorable composite with a clay mineral, thereby further improving the gas-barrier property of a formed coating film layer, which can be put into practical use, which has favorable stability, and which contains a polyhydroxyurethane resin and a clay mineral. Moreover, the second object of the present invention is to realize and provide a gas-barrier aqueous coating agent and a resin film having an excellent gas-barrier property by using the aqueous dispersion composition provided above.

Solution to Problem

The above-described objects are achieved by the present invention described below.

The first present invention provides an aqueous polyhydroxyurethane resin dispersion being an aqueous dispersion containing a polyhydroxyurethane resin dispersed in particle diameters of 0.001 μm to 10 μm in water, wherein the polyhydroxyurethane resin contains a repeating unit represented by the following formula (1) as a basic structure and has a carboxyl group-containing chemical structure moiety represented by the following formula (6) in the structure.

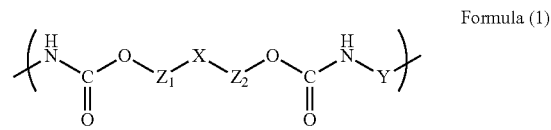

Formula (1)

wherein: —X— represents a direct bond, an aliphatic hydrocarbon group having 1 to 30 carbon atoms, an alicyclic hydrocarbon group having 4 to 40 carbon atoms, or an aromatic hydrocarbon group having 6 to 40 carbon atoms, and in structures of these groups, anyone of an ether bond, an amino bond, a sulfonyl bond, and an ester bond, or as a substituent, any one of a hydroxy group, a halogen atom, and a polyalkylene glycol chain having a number of repeating units of 1 to 30 each having 2 to 6 carbon atoms is optionally contained; Y— represents an aliphatic hydrocarbon group having 1 to 15 carbon atoms, an alicyclic hydrocarbon group having 4 to 15 carbon atoms, or an aromatic hydrocarbon group having 6 to 15 carbon atoms, and in structures of these groups, an ether bond or a sulfonyl bond, or as a substituent, any one of a hydroxy group and a halogen atom is optionally contained; —$Z_1$— and —$Z_2$— each independently represent at least anyone of structures selected from the group consisting of the following formula (2), formula (3), formula (4), and formula (5), and two types or more of the structures selected from these formulas (2) to (5) are optionally mixed within repeating units and between repeating units; and in any of cases where any one of formulas (2) to (5) is selected, a bond on a right side bonds with an oxygen atom, and a bond on a left side bonds with X, and in a case where X represents a direct bond, the bond on the left side bonds with a bond on a left side of the other Z.

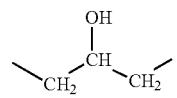

Formula (2)

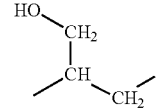

Formula (3)

-continued

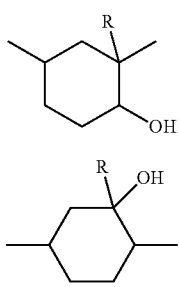
Formula (4)

Formula (5)

wherein R in formula (4) or formula (5) represents a hydrogen atom or a methyl group.

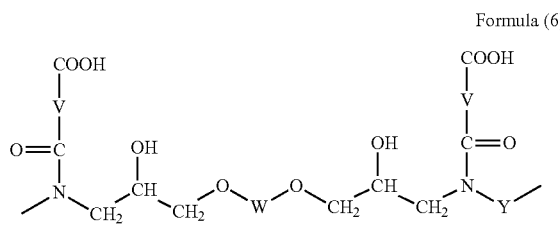
Formula (6)

wherein: —W— represents an aliphatic hydrocarbon group having 1 to 30 carbon atoms, an alicyclic hydrocarbon group having 4 to 40 carbon atoms, or an aromatic hydrocarbon group having 6 to 40 carbon atoms, and in structures of these groups, any one of an ether bond, an amino bond, a sulfonyl bond, and an ester bond, or as a substituent, anyone of a hydroxy group, a halogen atom, and a polyalkylene glycol chain having a number of repeating units of 1 to 30 each having 2 to 6 carbon atoms is optionally contained; Y— represents a part to be bonded with a urethane structure having a bond represented by formula (1) and is selected from those represented as Y— in the formula (1); and —V— represents a hydrocarbon group having 1 to 10 carbon atoms or an aromatic hydrocarbon group having 6 to 10 carbon atoms, and in structures of these groups, an oxygen atom or a nitrogen atom is optionally contained.

Preferred embodiments of the aqueous polyhydroxyurethane resin dispersion according to the first present invention include embodiments having the following constitution.

The polyhydroxyurethane resin has a weight average molecular weight in a range of 10000 to 100000 and an acid value in a range of 15 mgKOH/g to 50 mgKOH/g, and a hydroxyl value in a range of 150 mgKOH/g to 250 mgKOH/g; and a basic structure part of the polyhydroxyurethane resin, the basic structure part represented by the formula (1), contains a polyaddition reaction product of a compound having, at least apart thereof, at least two pentacyclic carbonate structures, the compound synthesized using carbon dioxide as a raw material, and a compound having at least two primary amino groups, and an —O—CO— bond derived from the carbon dioxide accounts for 1 to 30% by mass of a total mass of the polyhydroxyurethane resin.

The first present invention provides as another embodiment a method for producing the above-described aqueous polyhydroxyurethane resin dispersion, the method including: a polymerization step of subjecting a compound having at least two epoxy groups and a compound having at least two pentacyclic carbonate structures to a polyaddition reaction with a compound having at least two primary amino groups in a hydrophilic solvent, thereby obtaining a polyhydroxyurethane resin containing secondary amino groups in a structure thereof; an ionic group introduction step of further reacting a cyclic acid anhydride with the secondary amino group, thereby obtaining a polyhydroxyurethane resin having in a structure thereof a carboxyl group to be an ionic group; and a step of performing phase-transfer emulsification neutralizing the carboxyl group in the obtained polyhydroxyurethane resin and then adding water.

Preferred embodiments of the method for producing the above-described aqueous dispersion include: in the polymerization step, the compound having epoxy groups is reacted with the compound having primary amino groups under a condition where an amount of the primary amino group is excessive in such a way as to be primary amino group/epoxy ratio=4/1 or larger in terms of an equivalent ratio of the amino group to the epoxy group, thereby leaving the primary amino group unreacted, and thereafter the compound having pentacyclic carbonate structures is subjected to a polyaddition reaction with the primary amino groups left unreacted.

The first present invention provides as another embodiment a gas-barrier resin film having: a base material; and a coating film layer containing a polyhydroxyurethane resin on at least one face of the base material, wherein the polyhydroxyurethane resin is a resin constituting any one of the above-described aqueous polyhydroxyurethane resin dispersions, the coating film layer has a thickness of 0.1 to 100 μm and an oxygen transmission rate of 50 mL/m²·day·atm or less at 23° C. in a humidity of 65%.

The second present invention provides a clay mineral-containing aqueous polyhydroxyurethane resin dispersion composition, the composition being an aqueous dispersion composition of a composite material containing: as an (A) component an anionic polyhydroxyurethane resin having a carboxyl group and a hydroxy group; and as an (B) component a layered clay mineral, wherein a total content of the (A) component and the (B) component is 10 to 50% by mass; the (B) component is contained in a range of 1 to 100 parts by mass based on 100 parts by mass of the (A) component; and a chemical structure of the anionic polyhydroxyurethane resin being the (A) component and having a carboxyl group and a hydroxy group contains a repeating unit represented by the following formula (1) as a basic structure and has a carboxyl group-containing chemical structure moiety represented by the following formula (6).

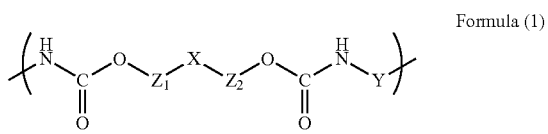
Formula (1)

wherein: —X— represents a direct bond, an aliphatic hydrocarbon group having 1 to 30 carbon atoms, an alicyclic hydrocarbon group having 4 to 40 carbon atoms, or an aromatic hydrocarbon group having 6 to 40 carbon atoms, and in structures of these groups, any one of an ether bond, an amino bond, a sulfonyl bond, and an ester bond, or as a substituent, any one of a hydroxy group, a halogen atom, and a polyalkylene glycol chain having a number of repeating units of 1 to 30 each having 2 to 6 carbon atoms is optionally contained; Y— represents an aliphatic hydrocarbon group having 1 to 15 carbon atoms, an alicyclic hydrocarbon group having 4 to 15 carbon atoms, or an aromatic hydrocarbon group having 6 to 15 carbon atoms, and in structures of these groups, an ether bond or a sulfonyl bond, or as a substituent, any one of a hydroxy group and a halogen atom is optionally contained; —$Z_1$— and —$Z_2$— each independently represent at least anyone of structures selected from the group consisting of the following formula (2), formula (3), formula (4), and formula (5), and two types or more of the structures selected from these formulas (2) to (5) are optionally mixed within repeating units and between repeating units; and in any of cases where any one of formulas (2) to (5) is selected, a bond on a right side bonds with an oxygen atom, and a bond on a left side bonds with X, and in a case where X represents a direct bond, the bond on the left side bonds with a bond on a left side of the other Z.

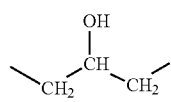

Formula (2)

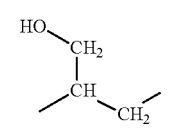

Formula (3)

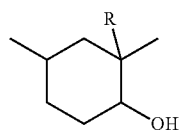

Formula (4)

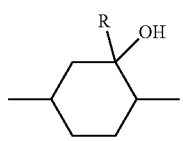

Formula (5)

wherein R in formula (4) or formula (5) represents a hydrogen atom or a methyl group.

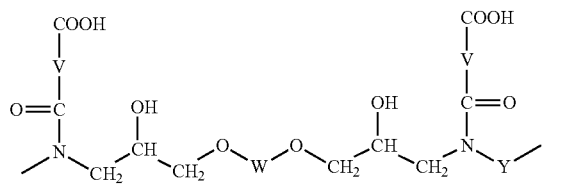

Formula (6)

wherein: —W— represents an aliphatic hydrocarbon group having 1 to 30 carbon atoms, an alicyclic hydrocarbon group having 4 to 40 carbon atoms, or an aromatic hydrocarbon group having 6 to 40 carbon atoms, and in structures of these groups, any one of an ether bond, an amino bond, a sulfonyl bond, and an ester bond, or as a substituent, anyone of a hydroxy group, a halogen atom, and a polyalkylene glycol chain having a number of repeating units of 1 to 30 each having 2 to 6 carbon atoms is optionally contained; Y— represents a part to be bonded with a urethane structure having a bond represented by formula (1) and is selected from those represented as Y— in the formula (1); and —V— represents a hydrocarbon group having 1 to 10 carbon atoms or an aromatic hydrocarbon group having 6 to 10 carbon atoms, and in structures of these groups, an oxygen atom or a nitrogen atom is optionally contained.

Preferred embodiments of the above-described clay mineral-containing aqueous polyhydroxyurethane resin dispersion composition according to the second present invention include embodiments having the following constitution. The anionic polyhydroxyurethane resin being the (A) component has a weight average molecular weight in a range of 10000 to 100000, an acid value in a range of 15 mgKOH/g to 50 mgKOH/g, and a hydroxyl value in a range of 150 mgKOH/g to 250 mgKOH/g; a basic structure part of the anionic polyhydroxyurethane resin being the (A) component, the basic structure part represented by the formula (1), contains a polyaddition reaction product of a compound having, at least apart thereof, at least two pentacyclic carbonate structures, the compound synthesized using carbon dioxide as a raw material, and a compound having at least two primary amino groups, and an —O—CO— bond derived from the carbon dioxide accounts for 1 to 30% by mass of a total mass of the anionic polyhydroxyurethane resin being the (A) component; and the layered clay mineral being the (B) component is at least any one selected from the group consisting of montmorillonite, saponite, hectorite, vermiculite, kaolinite, and mica.

The second present invention provides as another embodiment a gas-barrier aqueous coating agent containing the above-described clay mineral-containing aqueous polyhydroxyurethane resin dispersion composition as an essential component.

The second present invention provides as another embodiment a gas-barrier resin film having: a base material; and a coating film layer provided on at least one face of the base material and formed with a composite material containing a polyhydroxyurethane resin and a clay mineral, wherein: the composite material is any one of the above-described clay mineral-containing aqueous polyhydroxyurethane resin dispersion compositions; and the coating film layer has a thickness of 0.1 to 100 μm, and the coating film layer has an oxygen transmission rate of 10 mL/m²·day·atm or less at 23° C. in a humidity of 65%.

Advantageous Effects of Invention

According to the first present invention (hereinafter, referred to as "first invention"), an aqueous dispersion which can be used as a resin for forming a coating film in water-based paints or coating agents and which contains a polyhydroxyurethane resin dispersed in small particle diameters of about 0.001 μm to about 10 μm in water is provided. The aqueous polyhydroxyurethane resin dispersion which is provided by the present invention has more excellent stability, can be stored in a longer period of time than aqueous resin dispersions provided by the conventional techniques, and can control the hydroxy group of the polyhydroxyurethane resin in a constant amount, and therefore the performance of a paint film (coating film layer) obtained with the polyhydroxyurethane resin can be made to realize the performance which is equal to the performance of a paint film which is obtained from a conventional solvent type polyhydroxyurethane resin in, for example, adhesiveness, water resistance, and the like. In addition, the production method according to the present invention also has an advantage of enabling the synthesis of a polyhydroxyurethane resin having a chemical structure that enhances the gas-barrier property of a formed coating film further, which is desired in the present invention, and further has an advantage of making it possible to make the range of the particle diameters of the synthesized polyhydroxyurethane resin small, the range being important for the stability of an aqueous dispersion.

The aqueous polyhydroxyurethane resin dispersion which is provided by the first invention (hereinafter, also referred to as "aqueous dispersion according to the first invention") can be utilized as a resin for forming a coating film in water-based paints and a formed paint film (coating film layer) can satisfy the performance, and therefore by using this aqueous dispersion, release of organic solvents in environments during use, which is a problem in solvent-based paints, does not occur and water-based paints and the like which reduce environmental load can be provided. In addition, the polyhydroxyurethane resin that characterizes the present invention is a resin which can be produced using carbon dioxide as a raw material (forming material) and can contribute to further reduction of environmental load in addition to reduction of environmental load by being a water-based material, so that the polyhydroxyurethane resin that characterizes the present invention is also useful in this point.

In addition, according to the second present invention (hereinafter, referred to as "second invention"), an aqueous dispersion composition which can be used as a resin for forming a coating film in water-based paints and coating agents, the aqueous dispersion composition containing a polyhydroxyurethane resin and a clay mineral being favorably formed into a complex and dispersed therein is provided. The aqueous dispersion composition which is provided by the present invention has more excellent stability, can be stored in a longer period of time than aqueous resin dispersions provided by the conventional techniques, and can control the hydroxy group in the polyhydroxyurethane resin in a constant amount, and therefore the performance of a paint film (coating film layer) obtained with the polyhydroxyurethane resin can be made to realize the performance which is equal to the performance of a paint film which is obtained from a conventional solvent type polyhydroxyurethane resin in, for example, adhesiveness, water resistance, and the like.

Besides, the aqueous dispersion composition according the second invention is a composition in which a clay mineral which is known to improve the gas-barrier property is dispersed in water in a favorable state, and therefore a coating film having a more excellent gas-barrier property can be easily prepared. In addition, the aqueous dispersion composition according to the second invention can be utilized as a resin for forming a coating film in water-based paints, and therefore by using this aqueous dispersion composition, release of organic solvents in environments during use, which is a problem in solvent-based paints, does not occur and the performance of a paint film (coating film layer) can be satisfied, so that water-based paints and the like which reduce environmental load can be provided. In addition, the polyhydroxyurethane resin that constitutes the aqueous dispersion composition according to the second invention is a resin which can be produced using carbon dioxide as a raw material (forming material) and can contribute to further reduction of environmental load in addition to reduction of environmental load by being a water-based material, so that the polyhydroxyurethane resin that constitutes the aqueous dispersion composition according to the second invention is also useful in this point.

BRIEF DESCRIPTION OF DRAWINGS

FIG. 1 shows a result of a particle size distribution measured for an aqueous dispersion of Example 1-1 according to the first invention.

DESCRIPTION OF EMBODIMENTS

Hereinafter, the present invention will be described in detail giving preferred embodiments for carrying out the present invention. The first invention relates to an aqueous dispersion containing a polyhydroxyurethane resin dispersed in particle diameters of 0.001 μm to 10 μm in water and is characterized in that the polyhydroxyurethane resin contains a repeating unit represented by the following formula (1) as a basic structure and has a carboxyl group-containing chemical structure moiety represented by the following formula (6) in the structure. In this way, the first invention allows the polyhydroxyurethane resin to have the carboxyl group-containing chemical structure moiety represented by formula (6) in the basic structure of the polyhydroxyurethane resin which constitutes the first invention, thereby enabling phase-transfer emulsification by addition of water, and as a result, enables stable dispersion of a polyhydroxyurethane resin in small particle diameters of 0.001 μm to 10 μm in water. It is to be noted that the particle diameters of 0.001 μm to 10 μm, which are specified in the first invention, mean a range of the particle size distribution of the particles dispersed in the aqueous dispersion.

In addition, the second invention is an aqueous dispersion composition obtained by making a composite of a polyhydroxyurethane resin and a clay mineral to achieve a state in which these are favorably dispersed, the aqueous dispersion composition containing: as an (A) component having a particular structure an anionic polyhydroxyurethane resin having a carboxyl group and a hydroxy group; and as a (B) component a layered clay mineral, wherein a total content of the (A) component and the (B) component is 10 to 50% by mass, and the (B) component is contained in a range of 1 to 100 parts by mass based on 100 parts by mass of the (A) component. The anionic polyhydroxyurethane resin having a carboxyl group and a hydroxy group being the (A) component that characterizes the second invention (hereinafter, sometimes simply written as (A) component or polyhydroxyurethane resin) contains a repeating unit represented by the following formula (1) as a basic structure, has a carboxyl group-containing chemical structure moiety represented by the following formula (6), and has a chemical structure similar to that of the above-described polyhydroxyurethane resin that characterizes the first invention.

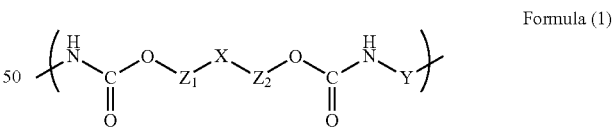

Formula (1)

wherein: —X— represents a direct bond, an aliphatic hydrocarbon group having 1 to 30 carbon atoms, an alicyclic hydrocarbon group having 4 to 40 carbon atoms, or an aromatic hydrocarbon group having 6 to 40 carbon atoms, and in structures of these groups, any one of an ether bond, an amino bond, a sulfonyl bond, and an ester bond, or as a substituent, any one of a hydroxy group, a halogen atom, and a polyalkylene glycol chain having a number of repeating units of 1 to 30 each having 2 to 6 carbon atoms is optionally contained; Y— represents an aliphatic hydrocarbon group having 1 to 15 carbon atoms, an alicyclic hydrocarbon group having 4 to 15 carbon atoms, or an aromatic hydrocarbon group having 6 to 15 carbon atoms, and in structures of these groups, an ether bond or a sulfonyl bond, or as a substituent, any one of a hydroxy group and a halogen atom is optionally contained; —$Z_1$— and —$Z_2$— each independently represent at least anyone of structures selected from the group consisting of the following formula (2), formula (3), formula (4), and formula (5), and two types or more of the structures selected from these formulas (2) to (5) are optionally mixed within repeating units and between repeating units; and in any of cases where any one of formulas (2) to (5) is selected, a bond on a right side bonds with an oxygen atom, and a bond on a left side bonds with X, and in a case where X represents a direct bond, the bond on the left side bonds with a bond on a left side of the other Z.

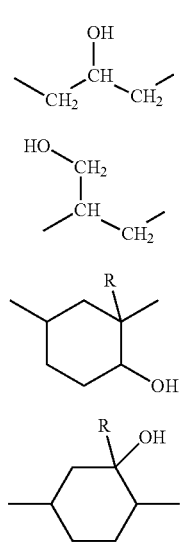

Formula (2)

Formula (3)

Formula (4)

Formula (5)

wherein R in formula (4) or formula (5) represents a hydrogen atom or a methyl group.

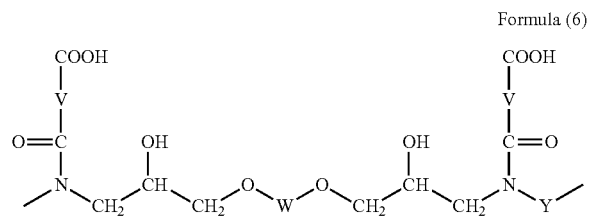

Formula (6)

wherein: —W— represents an aliphatic hydrocarbon group having 1 to 30 carbon atoms, an alicyclic hydrocarbon group having 4 to 40 carbon atoms, or an aromatic hydrocarbon group having 6 to 40 carbon atoms, and in structures of these groups, any one of an ether bond, an amino bond, a sulfonyl bond, and an ester bond, or as a substituent, anyone of a hydroxy group, a halogen atom, and a polyalkylene glycol chain having a number of repeating units of 1 to 30 each having 2 to 6 carbon atoms is optionally contained; Y— represents a part to be bonded with a urethane structure having a bond represented by formula (1) and is selected from those represented as Y— in the formula (1); and —V— represents a hydrocarbon group having 1 to 10 carbon atoms or an aromatic hydrocarbon group having 6 to 10 carbon atoms, and in structures of these groups, an oxygen atom or a nitrogen atom is optionally contained.

Hereinafter, the polyhydroxyurethane resin constituting each of the first present invention and the second invention and having the above-described structure that characterizes these kinds of invention (hereinafter, referred to as "polyhydroxyurethane resin for use in the present invention" or simply referred to as "polyhydroxyurethane resin") will be described. First of all, in the structure which is contained in the basic structure and which is represented by the formula (1) being a repeating unit, all the repeating units may have the same structure; however, the repeating units are not limited to these, and a plurality of different structures may exist as long as the different structures are structures in the range specified above. For example, the structure may be constituted in such a way that both $Z_1$ and $Z_2$ in formula (1) have only the previously described chemical structure of formula (2), or, for example, the structure may be constituted in such a way that a structure in which $Z_1$ has the chemical structure of formula (4), a structure in which $Z_2$ has the chemical structure of formula (5), and a structure in which both $Z_1$ and $Z_2$ have the chemical structure of formula (3) are mixed.

In addition, in the structure which is contained in the basic structure and represented by formula (6), all the repeating units may also have the same structure, and different structures may also be mixed. Further, Y in formula (1) and Y in formula (6) may have the same structure or may have a structure which is different from each other as long as the structure is in the range where —Y can have. In addition, Y may be different for every repeating unit. That is, in the basic structure of the polyhydroxyurethane resin for use in the present invention, a plurality of Ys each having a different structure may be mixed.

As a general method for producing a polymer emulsion, there exist a forced emulsification method using a surfactant as an emulsifying agent and a self-emulsification method of introducing a hydrophilic group in a polymer chain to form an emulsified particle by the polymer chain itself. The aqueous dispersion according to the first invention and the aqueous dispersion composition according to the second invention belong to a self-emulsification type. That is, the polyhydroxyurethane resin for use in the present invention enables self-emulsification by introducing in the structure of the resin a carboxyl group being an anionic group as a hydrophilic group needed for emulsification, as shown in the structure of the formula (6).

With respect to the polyhydroxyurethane resin containing a repeating unit represented by the formula (1) as a basic structure, the part of the basic structure can be produced by the following step. Specifically, the part of the basic structure is obtained by a polyaddition reaction of a compound having at least two pentacyclic carbonates in one molecule (hereinafter, sometimes simply referred to as cyclic carbonate compound) and a compound having at least two primary amino groups in one molecule (hereinafter, sometimes simply referred to as amine compound).

In a reaction of a cyclic carbonate and an amine, the reaction forming a polymer chain of a polyhydroxyurethane resin, it is known that two types of cleavages of the cyclic carbonate exist and two types of structures shown by the following model reaction are produced.

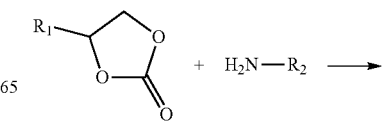

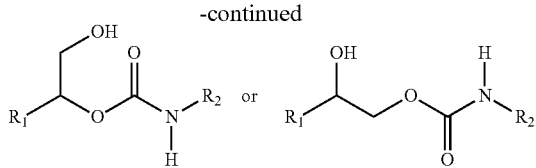

Accordingly, each of the structures of —$Z_1$— and —$Z_2$— in the formula (1) which represents the polyhydroxy urethane resin obtained by the polyaddition reaction is any of the structures of the above-described formulas (2) to (5), and the existence thereof is random.

It is preferable that the cyclic carbonate compound for use in producing the polyhydroxyurethane resin have a cyclic carbonate structure, as described below, obtained by a reaction of an epoxy compound and carbon dioxide. Specifically, for example, when an epoxy compound being a raw material is reacted in the presence of a catalyst at a temperature of 0° C. to 160° C. in a carbon dioxide atmosphere pressurized at about atmospheric pressure to about 1 MPa for 4 to 24 hours, a cyclic carbonate compound in which carbon dioxide is fixed to an ester moiety can be thereby obtained.

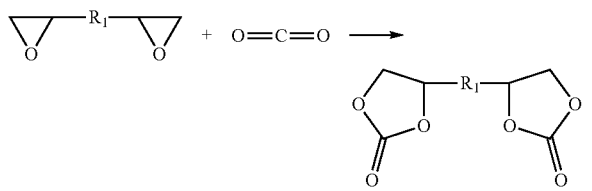

The polyhydroxyurethane resin obtained by using for the polyaddition reaction the cyclic carbonate compound synthesized using carbon dioxide as a raw material in the manner as described above has in the structure thereof an —O—CO— bond in which carbon dioxide is fixed. It is preferable that the content of the —O—CO— bond derived from carbon dioxide (amount of carbon dioxide fixed) in the polyhydroxyurethane resin be as much as possible from the standpoint of utilizing carbon dioxide as a raw material, and for example, carbon dioxide can be contained in a range of 1 to 30% by mass in the structure of the polyhydroxyurethane resin obtained by the above-described synthesis method.

Examples of preferred catalysts for use in the above-described reaction of an epoxy compound and carbon dioxide include salts such as lithium chloride, lithium bromide, lithium iodide, sodium chloride, sodium bromide, and sodium iodide, and quaternary ammonium salts. The amount of use thereof is 1 to 50 parts by mass and preferably 1 to 20 parts by mass per 100 parts by mass of the epoxy compound. In addition, triphenyl phosphine or the like may be used together in order to improve the solubility of these salts each to be a catalyst.

The above-described reaction of an epoxy compound and carbon dioxide can also be performed in the presence of an organic solvent. Any of organic solvents can be used as the organic solvent as long as the solvent dissolves the previously described catalysts. Examples of preferred organic solvents include: amide-based solvents such as N,N-dimethylformamide, dimethyl sulfoxide, dimethylacetamide, and N-methyl-2-pyrrolidone; alcohol-based solvents such as methanol, ethanol, propanol, ethylene glycol, and propylene glycol; and ether-based solvents such as ethylene glycol monomethyl ether, ethylene glycol dimethyl ether, propylene glycol methyl ether, diethylene glycol monomethyl ether, diethylene glycol dimethyl ether, and tetrahydrofuran.

The structure of the cyclic carbonate compound which can be used for producing the polyhydroxyurethane resin is not particularly limited, and the cyclic carbonate compound having two or more cyclic carbonate structures in one molecule can be used. Any of the cyclic carbonate compounds having a benzene skeleton, an aromatic multicyclic skeleton, or a condensed multicyclic aromatic skeleton, and any of aliphatic and alicyclic cyclic carbonate compounds can be used. Examples of the compounds which can be used are given below with structural formulas. It is to be noted that R in the structural formulas represents a hydrogen atom or $CH_3$.

Examples of the cyclic carbonate compounds having a benzene skeleton, an aromatic multicyclic skeleton, or a condensed multicyclic aromatic skeleton include the following compounds.

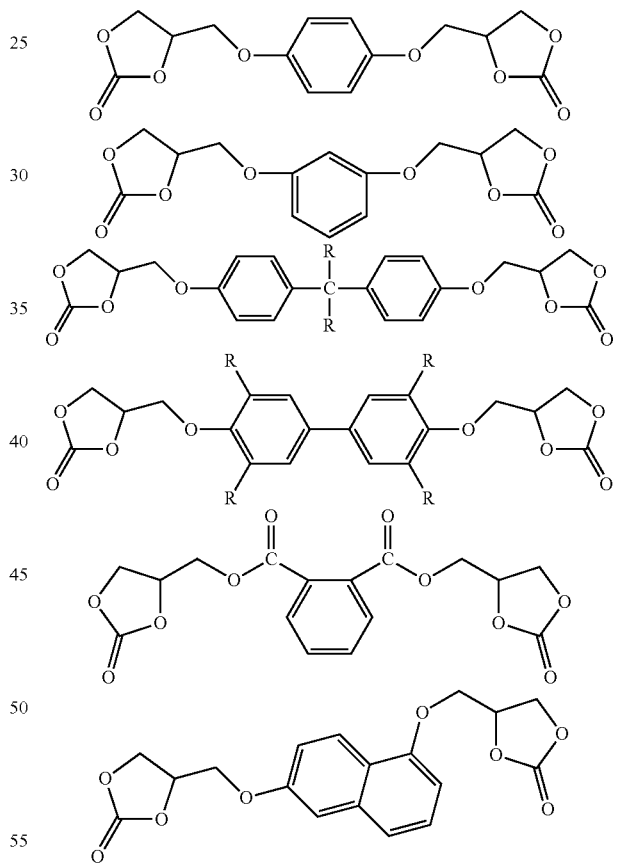

Examples of the aliphatic or alicyclic cyclic carbonate compounds include the following compounds.

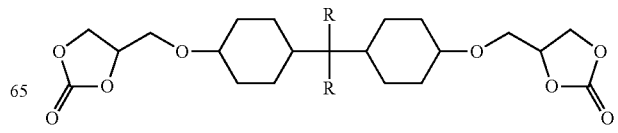

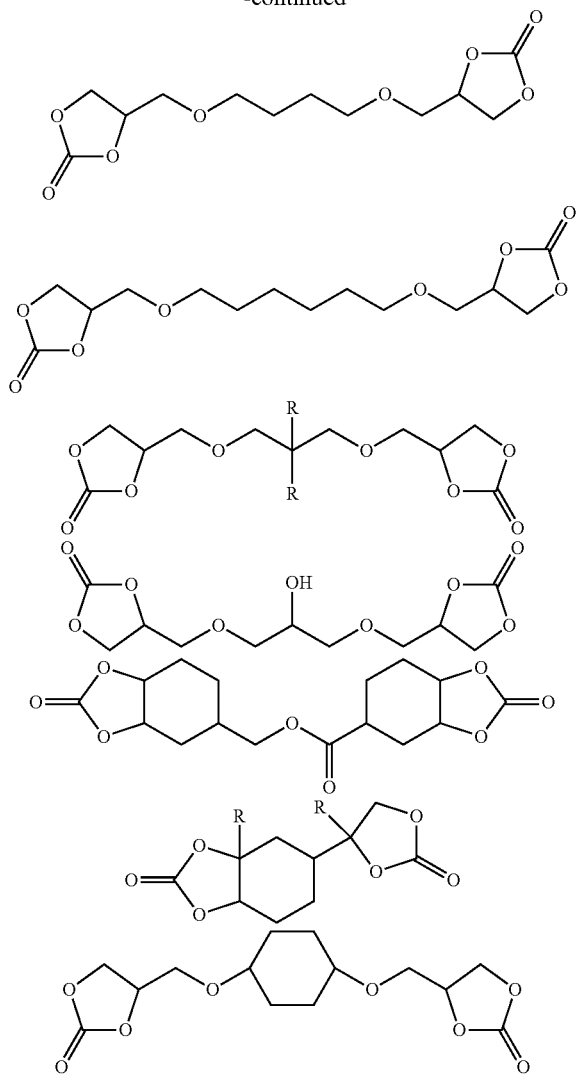

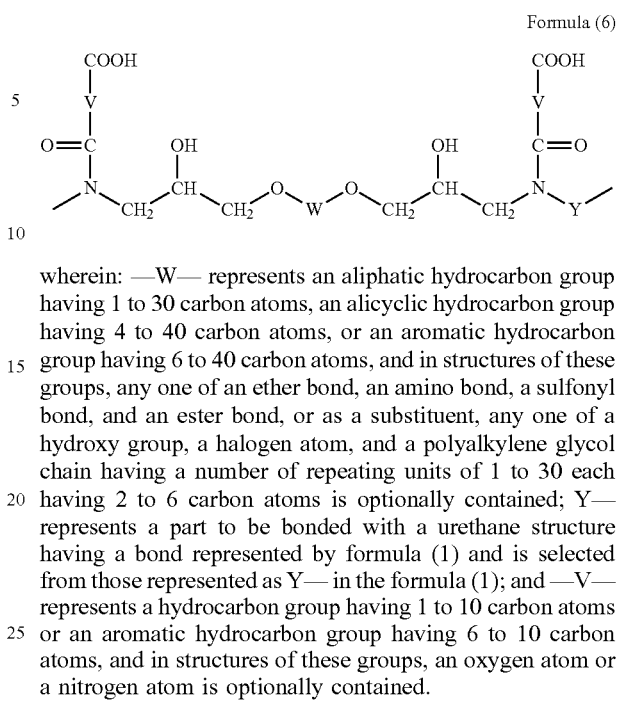

wherein: —W— represents an aliphatic hydrocarbon group having 1 to 30 carbon atoms, an alicyclic hydrocarbon group having 4 to 40 carbon atoms, or an aromatic hydrocarbon group having 6 to 40 carbon atoms, and in structures of these groups, any one of an ether bond, an amino bond, a sulfonyl bond, and an ester bond, or as a substituent, any one of a hydroxy group, a halogen atom, and a polyalkylene glycol chain having a number of repeating units of 1 to 30 each having 2 to 6 carbon atoms is optionally contained; Y— represents a part to be bonded with a urethane structure having a bond represented by formula (1) and is selected from those represented as Y— in the formula (1); and —V— represents a hydrocarbon group having 1 to 10 carbon atoms or an aromatic hydrocarbon group having 6 to 10 carbon atoms, and in structures of these groups, an oxygen atom or a nitrogen atom is optionally contained.

Method for Producing Aqueous Dispersion According to the First Invention and Method for Producing Polyhydroxyurethane Resin for Use in the Present Invention Introducing the carboxyl group-containing chemical structure moiety represented by the formula (6) in the basic structure can be stably performed, for example, by the production method described below, and when this chemical structure moiety is introduced, the aqueous dispersion according to the first invention can be thereby easily obtained. Hereinafter, the method for producing the aqueous polyhydroxyurethane resin dispersion according to the first invention will be described. This producing method is characterized by including: a polymerization step of subjecting a compound having at least two epoxy groups and a compound having at least two pentacyclic carbonate structures to a polyaddition reaction with a compound having at least two primary amino groups in a hydrophilic solvent, thereby obtaining a polyhydroxyurethane resin containing secondary amino groups in a structure thereof; an ionic group introduction step of further reacting a cyclic acid anhydride with the secondary amino group, thereby obtaining a polyhydroxyurethane resin having in a structure thereof a carboxyl group to be an ionic group; and a step of performing phase-transfer emulsification neutralizing the carboxyl group in the obtained polyhydroxyurethane resin and then adding water.

More preferred embodiment of the production method include that in the polymerization step, the compound having primary amino groups and the compound having epoxy groups are reacted under a condition where an amount of the primary amino group is excessive in such a way as to be primary amino group/epoxy ratio=4/1 or larger in terms of an equivalent ratio of the amino group to the epoxy group, thereby constituting the reaction so that the primary amino groups are left unreacted, and thereafter, for example, the cyclic carbonate compound which is obtained using carbon dioxide as a raw material and which is as described above is It is preferable that the polyhydroxyurethane resin for use in the present invention be produced by a polyaddition reaction of a compound having in a part thereof two or more pentacyclic carbonate structures, the compound synthesized using carbon dioxide as a raw material and listed above, and a compound having two or more primary amino groups.

Conventionally known compounds having primary amino groups can be used. Examples of preferred compounds include: chain aliphatic polyamines such as ethylenediamine, 1,3-diaminopropane, 1,4-diaminobutane, 1,6-diaminohexane (another name: hexamethylenediamine), 1,8-diaminooctane, 1,10-diaminodecane, and 1,12-diamino dodecane; cyclic aliphatic polyamines such as isophoronediamine, norbornanediamine, 1,6-cyclohexanediamine, piperazine, and 2,5-diaminopyridine; aliphatic polyamines having an aromatic ring such as xylenediamine (another name: meta-xylenediamine); and aromatic polyamines such as meta-phenylenediamine and diaminodiphenylmethane.

The polyhydroxyurethane resin for use in the present invention is characterized by having as a basic structure a repeating unit of formula (1) which can be produced in the manner as described above and having a carboxyl group-containing chemical structure moiety represented by the following formula (6) and introduced in the structure thereof.

subjected to a polyaddition reaction with the primary amino groups left unreacted, and thus the polyhydroxyurethane resin having a structure in which the chemical structure moiety of formula (6) is introduced in the previously described basic structure. When phase-transfer emulsification is performed after the polyhydroxyurethane resin is obtained in the manner as described above, the aqueous dispersion containing the polyhydroxyurethane resin dispersed in particle diameters of 0.001 μm to 10 μm is obtained stably.

Hereinafter, the mechanism through which the polyhydroxyurethane resin having the structure specified in the first invention can be stably obtained by constituting the polyhydroxyurethane resin as described above will be described. Firstly, in the case where the compound having two primary amino groups and the compound having two epoxy groups are reacted in a ratio such that an active hydrogen equivalent ratio is 1.0 (molar ratio of primary amino group/epoxy group of 1/2), a reaction of making a structure three-dimensional occurs and a cured resin product is obtained. However, the cured resin product the structure of which is made three-dimensional does not dissolve in a solvent, and therefore the aqueous dispersion being the object of the first invention cannot be produced. To deal with this, the present inventors have conducted diligent studies in order to obtain a stable aqueous dispersion and have found that it is effective to perform the reaction under a condition where the amount of the primary amino group is excessive in such a way that the equivalent ratio of the primary amino group to the epoxy group is primary amino group/epoxy group=4/1 or more. That is, by reacting the compound having two or more primary amino groups and the compound having two or more epoxy groups under a condition where the amount of the primary amino group is excessive and more preferably under a condition where the amount of the primary amino group is excessive in such a way as to be primary amino group/epoxy group=4/1 or larger, a compound having a primary amino group at both ends thereof and having secondary amino groups inside the structure thereof is obtained as an intermediate, and by utilizing the intermediate, stable introduction of the structure of formula (6) as the chemical structure moiety in the polyhydroxyurethane resin containing the previously described repeating unit represented by formula (1) as the basic structure is achieved.

A reaction formula in the case where primary amino group/epoxy group=4/1 is shown below. When the reaction is performed under such a condition where the amount of the amino group is excessive, a mixture of a compound (a) which is an intermediate having the following structure and a compound having the primary amino groups left unreacted can be thereby obtained.

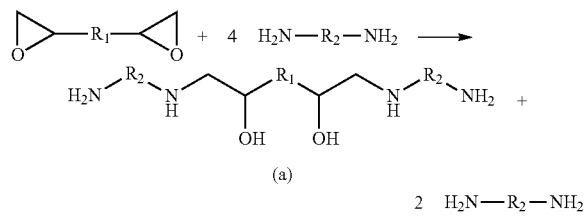

(a)

The compound (a) in the mixture obtained in the manner as described above has a primary amino group at both ends, and the compound (a) in the mixture obtained in the manner as described above as well as the previously described compound which is used for the above-described reaction and which has two primary amino groups in one molecule can be subjected to the poly addition reaction with the previously described cyclic carbonate compounds.

The compound (a) herein has a primary amino group at both ends and also has secondary amino groups in the structure thereof. It is already reported that in this case, a reaction of the secondary amino groups in the structure with the cyclic carbonate do not occur. For example, synthesis of a polyhydroxyurethane containing a secondary amino group in the main chain by a polyaddition reaction of a compound containing a primary amino group and a secondary amino group and a cyclic carbonate compound is reported in "J. Polym. Sci., Part A: Polym. Chem. 2005, 43, 5899-5905". Also in the production method according to the first invention, the form of the reaction is as described in the above reference, and therefore the polyhydroxyurethane resin containing a secondary amino group in the basic structure is obtained via a compound the structure of which is similar to that of the compound (a), which is obtained in the manner as described above, having a primary amino group at both ends and having secondary amino groups inside. In the production method according to the first invention, the secondary amino groups which are introduced in the polymerization step and which are to be left in the hydroxyurethane by the chemical structure moiety of formula (6) are reacted with a cyclic acid anhydride, and a carboxyl group is thereby introduced in the structure in the next ionic group introduction step. As a result, the polyhydroxyurethane resin which can constitute the aqueous dispersion according to the first invention, which contains a repeating unit represented by the formula (1) as a basic structure and has a carboxyl group-containing chemical structure moiety represented by the formula (6) in the structure is obtained, and in the next step of performing phase-transfer emulsification by addition of water, the aqueous dispersion according to the first invention containing the polyhydroxyurethane resin finely dispersed in water, specifically dispersed in particle diameters of about 0.001 μm to about 10 μm is obtained. As a matter of course, the polyhydroxyurethane resin which constitutes the second invention, which will be described later, can also be obtained by the above-described production method.

As described above, the polyhydroxyurethane resins which constitute the first invention and the second invention can be basically formed from the following three steps.

(1) A step of firstly reacting a compound having at least two epoxy groups with a compound having at least two primary amino groups under a condition where the amount of the primary amino group is excessive in such a way that the amino groups are left unreacted, thereby producing a compound (a) which is to be an intermediate and which has a primary amino group at both ends and secondary amino groups inside.

(2) A polymerization step of subjecting a compound having at least two pentacyclic carbonate structures to a polyaddition reaction with the compound (a) which is in a state where the primary amino group is left unreacted and which is the product of the step (1), thereby obtaining a polyhydroxyurethane resin having secondary amino groups.

(3) An ionic group introduction step of subjecting a cyclic acid anhydride to an addition reaction with the polyhydroxyurethane resin which is obtained in the step (2) and which has secondary amino groups.

The polyhydroxyurethane resin having secondary amino groups herein can also be obtained omitting the step (1) and reacting the three components of the cyclic carbonate compound, the epoxy compound, and a compound having amino groups at once. However, according to studies conducted by the present inventors, in this case, when the amount of use of the epoxy compound is increased, that is, when a larger amount of the secondary amino group is intended to be introduced in the main chain, a possibility of reacting the epoxy compound with the secondary amino group in the produced compound (a) becomes high and gelation becomes more liable to occur because the reaction product is made to form a three dimensional structure than in the case where the polyhydroxyurethane resin is produced via the step (1), and therefore the production method in which the step (1) is omitted is not suited to an industrial production method and it is difficult to say that such a production method is suitable.

As the compound which can be used in the step (1) and which has at least two primary amino groups, conventionally known compounds having at least two primary amino groups can be used. Specifically, the amine compounds which are the same as the amine compounds which can be used for the previously described synthesis of the polyhydroxyurethane resin containing a repeating unit of formula (1) as a basic structure can be used. Therefore, the description is omitted.

In addition, the compound which can be used in the step (1) and which has epoxy groups is not particularly limited except that the compound is at least bifunctional. For example, the epoxy compounds each used as a raw material for obtaining the previously described cyclic carbonate compounds are suitable. Specifically, in the cyclic carbonate compounds previously given as examples, compounds in which any of the pentacyclic carbonate group parts at the ends thereof is an epoxy group are each used as a raw material, and any of these compounds having epoxy groups can be used.

Conditions required for the polyaddition reactions between two compounds performed in the step (1) and the step (2), that is, the polyaddition reaction between the cyclic carbonate compound and the amine compound and the polyaddition reaction between the epoxy compound and the amine compound, are the same, and for example, the two compounds may be mixed and reacted at a temperature of 40 to 200° C. for 4 to 24 hours.

Both of the reactions can be performed without a solvent, but it is preferable to perform the reactions in a hydrophilic solvent taking the reaction in the next step and the emulsification step into consideration in the present invention. Examples of preferred hydrophilic solvents which can be used in performing these reactions include tetrahydrofuran, dioxane, dimethylformamide, N-methylpyrrolidone, dimethyl sulfoxide, methanol, ethanol, propanol, ethylene glycol, propylene glycol, ethylene glycol monomethyl ether, ethylene glycol dimethyl ether, propylene glycol methyl ether, diethylene glycol monomethyl ether, and diethylene glycol dimethyl ether. Among the solvents given above, particularly preferred solvents include tetrahydrofuran having a boiling point at which evaporation and distillation after the phase-transfer emulsification is easily performed.

The production of the polyhydroxyurethane resin for use in the present invention can be performed without using a catalyst in particular as described above; however, the production can also be performed in the presence of a catalyst as given below in order to facilitate the reaction. For example, basic catalysts such as triethylamine, tributylamine, diazabicycloundecene (DBU), triethylenediamine (DABCO), pyridine, and hydroxypyridine, and Lewis acid catalysts such as tetrabutyltin and dibutyltin dilaurate can be used. As preferred amount of use of these catalysts, these catalysts are used in a range of 0.01 to 10 parts by mass based on the total amount (100 parts by mass) of the carbonate compound and the amine compound to be used for the reaction.

Next, the reaction of introducing a carboxyl group in the polyhydroxyurethane resin as the ionic group introduction step of the step (3) will be described. In the step (3), a carboxyl group is introduced in the polyhydroxyurethane resin by reacting a cyclic acid anhydride with the secondary amino group contained in the polyhydroxyurethane resin obtained in the step (2).

The cyclic acid anhydride which can be used for the above-described reaction is not particularly limited. Compounds obtained in such a way that carboxyl groups of a compound having a plurality of carboxyl groups are subjected to dehydration condensation within a molecule can be suitably used. Specifically, for example, any of aliphatic acid anhydrides such as succinic anhydride, itaconic anhydride, maleic anhydride, caronic anhydride, citraconic anhydride, glutaric anhydride, diglycolic anhydride, and 1,2,3,4-butanetetracarboxylic dianhydride, and derivatives thereof, aromatic acid anhydrides such as phthalic anhydride, trimellitic anhydride, 1,2-naphthalic anhydride, and pyromellitic anhydride, and aliphatic acid anhydrides such as 1,1-cyclohexanediacetic anhydride, 1-cyclohexene-1,2-dicarboxylic anhydride, 1,1-cyclopentanediacetic anhydride, and 5-norbornene-2,3-dicarboxylic anhydride can be used. Examples of particularly preferred compounds among these include succinic anhydride and maleic anhydride because a low-molecular-weight compound exhibits emulsification stability by a small amount of use.

According to studies conducted by the present inventors, the amount of the secondary amino group in the polyhydroxyurethane resin which is shown previously as the compound (a) and which is an intermediate can be controlled by the use ratio of the amount of use of the epoxy compound for use in the above-described step (1) to the cyclic carbonate compound for use in the step (2), and thereby the amount of the carboxyl group in the polyhydroxyurethane resin obtained after the reaction with the cyclic acid anhydride in the step (3) can also be controlled.

In addition, according to studies conducted by the present inventors, the amount of the carboxyl group introduced in the polyhydroxyurethane resin and the diameters of emulsified particles which are formed in the step of thereafter performing phase-transfer emulsification by addition of water to the resin are in a proportional relationship, and the diameters of emulsified particles become smaller as the amount of the carboxyl group becomes larger. Conversely, when the amount of the carboxyl group becomes smaller, the diameters of emulsified particles become larger, and the emulsified state becomes unstable from a certain size. From such a reason, with respect to the diameters of emulsified particles of the polyhydroxyurethane resin dispersed in water, the polyhydroxyurethane resin is finely dispersed in particle diameters in a range of 0.001 µm to 10 µm and therefore can be made to constitute the aqueous dispersion according to the first invention without adjusting the particle diameters. In addition, it is also preferable that the particle diameters be adjusted so as to be within a range of 0.001 µm to 2 µm to prepare an aqueous dispersion in which the polyhydroxyurethane resin is more finely dispersed although the preferred particle diameters depend on the use of the aqueous dispersion.

In addition, with respect to the amount of the carboxyl group to be introduced in the polyhydroxyurethane resins which constitute the first invention and the second invention, when the amount is too small, the phase-transfer emulsification cannot be performed, and when the amount is too large, the carboxyl group has an adverse influence on the water resistance, and therefore it is preferable to adjust the blending ratio so that the acid value can be 15 mgKOH/g to 50 mgKOH/g. In addition, the degree of stability of emulsified particles is also influenced by the molecular weight of the resin, and therefore it is preferable that the weight average molecular weight of the resin be within a range of 10000 to 100000.

A coating film layer or a film can be formed by utilizing the aqueous dispersion according to the first invention which can be simply produced in the manner as described previously and which contains the polyhydroxyurethane resin dispersed in particle diameters of 0.001 μm to 10 μm in water. In addition, in the second invention, a coating film layer or a film can be formed by utilizing the aqueous dispersion composition being a composite material of the aqueous dispersion which is produced in the manner as described previously and which contains the polyhydroxyurethane resin dispersed favorably in water and a layered clay mineral. One of the characteristics of the first invention and the second invention is that these coating layers or films have a gas-barrier property. The gas-barrier property is exhibited due to the existence of the hydroxy group in the structure of the resin, and the extent of the gas-barrier property of a formed film depends on the amount of the hydroxy group in the structure of a coating film-forming resin to be used. In the case where the amount of the hydroxy group is small, there is a tendency that the formed film is inferior in the gas-barrier property, and conversely in the case where the amount of the hydroxy group is too large, a problem does not occur with respect to the gas barrier property, but the resin becomes hard to make the adhesiveness poor, and therefore, according to studies conducted by the present inventors, the preferred range of the amount of the hydroxy group in the structure of the resin required for achieving such purposes is in a range of 150 mgKOH/g to 250 mgKOH/g in terms of the hydroxyl value.

The carboxyl group existing in the structures of the polyhydroxyurethane resins which constitute the first invention and the second invention may be in a state as it is when the polyhydroxyurethane resin is subjected to the phase-transfer emulsification by addition of water to be made into an aqueous dispersion; however, it is preferable that part of the carboxyl groups or preferably all of the carboxyl groups be neutralized to be made into neutralized salts in advance in order to facilitate ionization in water. The carboxyl group can be left without being neutralized in order to be used for crosslinking or modification reaction, but in the case where the carboxyl group is utilized only as an ionic group for emulsification, it is preferable that all of the carboxyl groups be neutralized by using a neutralizing agent in an amount which is equimolar to the carboxyl group or in an excessive amount by about 1 to about 10% to the equimolar amount.

Examples of the basic compound for use in neutralization include: organic amines such as ethylamine, trimethylamine, triethylamine, triisopropylamine, tributylamine, triethanolamine, N-methyldiethanolamine, N-phenyldiethanolamine, monoethanolamine, dimethylethanolamine, diethylethanolamine, morpholine, N-methylmorpholine, 2-amino-2-ethyl-1-propanol, trimethylamine, triethylamine, tripropylamine, tributylamine, N-methyldiethanolamine, and triethanolamine; alkali metals such as lithium, potassium, and sodium; and inorganic bases such as sodium hydroxide, potassium hydroxide, calcium hydroxide, and ammonia, and these can be used together. Particularly preferred compounds among these basic compounds are compounds which can volatilize at the time of forming a paint film, and for example, it is preferable to use triethylamine. In the case where a neutralized salt is made using triethylamine or the like, the basic compound volatilizes at the time of forming a paint film, and therefore the water resistance of the paint film (coating film layer) is improved.

The polyhydroxyurethane resin which is obtained in the manner as described previously and which contains a repeating unit represented by formula (1), and which contains a carboxyl group-containing chemical structure moiety represented by formula (6) contains a carboxyl group or a salt thereof to be an ionic group in water, and therefore an oil-in-water type (O/W type) emulsion is obtained by adding water gradually to a solvent solution of the polyhydroxyurethane resin to thereby subject the polyhydroxyurethane resin to phase transfer (phase-transfer emulsification).

The amount of use of water to be added in subjecting the polyhydroxyurethane resin to the phase transfer depends on factors such as the chemical structure of the resin of the polyhydroxyurethane, the type of the solvent used in synthesizing the resin, the resin concentration, and viscosity but is approximately 50 parts by mass to approximately 200 parts by mass. The apparatus for use in performing the phase transfer may be similar to the apparatus the apparatus for use in the synthesis reaction; however, a continuous emulsifier or disperser can also be used. Usually, in the phase transfer step, heating is not necessary in particular, and it is efficient and preferable to perform the phase transfer step at a temperature of about 10° C. to about 30° C. in order to lower the solubility of water to the resin solution before the phase transfer.

In the first invention, further, the above-obtained O/W type emulsion is heated under a condition of reduced pressure and the solvent used for producing the polyhydroxyurethane resin is thereby volatilized, so that the aqueous dispersion according to the first invention in which only the resin component is dispersed in water can be obtained. The heating condition and pressure-reducing condition on this occasion are different depending on the boiling point of the solvent to be volatilized; however, a preferred condition is that water does not evaporate first. The pressure and temperature may be adjusted in a range of approximately 300 Torr to approximately 50 Torr and approximately 20° C. to approximately 70° C. It is to be noted that the aqueous dispersion according to the first invention contains the polyhydroxyurethane resin finely dispersed in water; however, the final solvent is not necessarily water alone, and if a solvent before subjecting the polyhydroxyurethane resin to the phase-transfer is left in the final solvent, such a final solvent can be used, and the final solvent may be adjusted so as to match the use. As will be described later, the aqueous dispersion composition according to the second invention can also be easily produced by utilizing the aqueous polyhydroxyurethane resin dispersion obtained in the manner as described above.

The aqueous dispersion according to the first invention is, for example, the aqueous dispersion which is obtained in the manner as described above and which contains the polyhydroxyurethane resin, which has the previously described particular structure, dispersed in particle diameters of 0.001 μm to 10 μm in water. It is to be noted that the average particle diameter (d50) of the aqueous dispersion according to the first invention is 0.005 μm to 0.5 μm. The content of the polyhydroxyurethane resin in water is different depending on the use and is not particularly limited. It is preferable that the content be, for example, about 10 to about 50% in terms of the solid content in the aqueous dispersion.

Aqueous Dispersion Composition According to The Second Invention

The aqueous dispersion composition according to the second invention is a composite material containing: as the (A) component the polyhydroxyurethane resin having the previously described particular chemical structure; and as the (B) component the layered clay mineral, wherein the (B) component is contained in a range of 1 to 100 parts by mass based on 100 parts by mass of the (A) component. The aqueous dispersion composition according to the second invention can be easily produced, for example, by dispersing the layered clay mineral as the (B) component in the aqueous dispersion which is produced in the manner as described previously and which contains the polyhydroxyurethane resin as the (A) component dispersed therein and making a composite of the two components. Using a clay mineral which has been swollen with/dispersed in water in advance in dispersing the (B) component in the above-described production of the aqueous dispersion composition of the second invention is also a preferred embodiment. However, the production method for obtaining the aqueous dispersion composition according to the second invention is not limited to the above-described example, and the aqueous dispersion composition according to the second invention can also be obtained by a method of putting the (A) component and the (B) component in water and stirring and mixing a resultant mixture, or other methods. The (A) component is the particular anionic polyhydroxyurethane resin which is the same as the previously described polyhydroxyurethane resin and which has a carboxyl group and a hydroxy group, and the constitution of this polyhydroxyurethane resin and the method for producing the resin, and the aqueous dispersion containing this polyhydroxyurethane resin dispersed therein and the method for producing the aqueous dispersion are as described previously.

The clay mineral which constitutes the aqueous dispersion composition according to the second invention and which is the (B) component is a substance having a layered structure constituted by laminating a large number of sheets each having a layered structure such as a silicate mineral. In the second invention, this layered clay mineral is used. Specific examples include montmorillonite, saponite, hectorite, vermiculite, kaolinite, and mica, and particularly preferred clay minerals having a layered structure are montmorillonite, saponite, and mica. With respect to these clay minerals, any of natural products and synthesized products can be used.

A clay mineral having the above-described properties is usually swollen with water and the interlayer distance becomes wide. In the aqueous dispersion composition according to the second invention, the resin penetrates in the interlayers of the swollen clay mineral, and thereby, the dispersion state is stabilized and a coating film containing the clay mineral uniformly dispersed at the time of forming the coating film can be formed. In the interlayers of the clay mineral, a cationic substance such as a sodium ion is inserted, and it is usually considered that it is hard for penetration into the interlayers of the clay mineral to occur with respect to a polymer in which a carboxyl group which is anionic has been introduced, such as the polyhydroxyurethane resin for use in the present invention. However, it has been found that in the case where the polyhydroxyurethane resin as the (A) component for use in the present invention is applied, uniform dispersion is performed. The present inventors consider the reason as described below. That is, the polyhydroxyurethane resin for use in the present invention has a secondary amide group at a moiety in the vicinity of a carboxyl group in the structure thereof, and it is considered that due to the contribution of the cationic property of this secondary amide group, the resin can be made to penetrate easily in the interlayers of the clay mineral in which it is generally hard for the penetration of a resin to occur.

It is known that the gas-barrier property of a resin coating film in which a clay mineral is dispersed uniformly becomes enhanced, and similar effects are also exhibited in a coating film formed using the aqueous dispersion composition according to the second invention. With respect to the amount of use of the clay mineral which constitutes the aqueous dispersion composition according to the second invention, it is required that the (B) component being the layered clay mineral be 1 to 100 parts by mass based on 100 parts by mass of the (A) component being the anionic polyhydroxyurethane resin. When the amount of the layered clay mineral being the (B) component is larger than the above-described range, the paint film (coating film layer) becomes hard and liable to be broken, and the transparency becomes lowered. On the other hand, when the amount of the (B) component is smaller than the above-described range, the effect of improving the gas-barrier property becomes weakened. As a preferred range, the (B) component is 3 to 50 parts by mass based on 100 parts by mass of the (A) component.

In addition, with respect to the concentration of the aqueous dispersion composition according to the second invention, it is required that the total content of the (A) anionic polyhydroxyurethane resin component and the (B) layered clay mineral component be 10 to 50% by mass as the concentration in the aqueous dispersion. The total content is preferably 20 to 40% by mass. The total content can be adjusted to the optimum concentration according to the various processing methods in obtaining a paint film.

In producing the aqueous dispersion composition according to the second invention, the method of dispersing the layered clay mineral as the (B) component into the aqueous dispersion which is obtained easily, for example, by the previously described method and which contains the anionic polyhydroxyurethane resin being the (A) component dispersed favorably therein is not particularly limited. For example, a method of adding the layered clay mineral as the (B) component as it is into the aqueous resin dispersion, thereby dispersing the layered clay mineral as the (B) component may be used, a method of adding the clay mineral which has been dispersed in water in advance may be used, and any of the methods can be applied. According to studies conducted by the present inventors, dispersing a water-swellable clay mineral is more efficiently performed in water alone than in the case of producing an aqueous resin dispersion, and therefore the latter method is a more preferred method in terms of production efficiency.

In the case where the layered clay mineral as the (B) component is dispersed in water or the aqueous anionic polyhydroxyurethane resin dispersion as the (A) component, dispersion can be performed by only usual stirring, but particularly in the case where the layered clay mineral as the (B) component is dispersed in a high concentration, the dispersion may require a longtime in some cases. Accordingly, it is preferable to perform stirring while perform heating at 70° C. or higher in order to shorten the production steps. In addition, the dispersion liquid exhibits a high thixotropic property, and therefore it is more effective to use a disperser such as a stirring apparatus or an ultrasonic disperser.

Additional Components

The aqueous dispersion according to the first invention and the aqueous dispersion composition according to the second invention can be used adding various types of rheology modifiers according to the required properties at the time of processing (at the time of use). In addition, if necessary, various additives may be added to the aqueous dispersion according to the first invention and the aqueous dispersion composition according to the second invention, and for example, an antioxidant, a light stabilizer, an ultraviolet absorber, and the like can be added.

In addition, when the aqueous dispersion according to the first invention and the aqueous dispersion composition according to the second invention are used blending a curing agent which is soluble/dispersible in water, a crosslinked paint film can thereby be prepared. Examples of the curing agent which can be used in producing a crosslinked paint film include, but not particularly limited to: water-dispersible component which can be reacted with a hydroxy group; polyisocyanates; block isocyanates; epoxy compounds; chelate compounds of a metal such as aluminum or titanium; melamine resins; and aldehyde compounds. In addition, crosslinking agents which can react with a carboxyl group can also be used, and water-dispersible carbodiimides and the like can also be used in addition to the previously described compounds.

Formation of Paint Film (Coating Film Layer)

The methods of obtaining a paint film (coating film layer) using the aqueous dispersion according to the first invention or the aqueous dispersion composition according to the second invention include applying the aqueous dispersion according to the first invention or the aqueous dispersion composition according to the second invention with, for example, a gravure coater, a knife coater, a reverse coater, a bar coater, a spray coater, a slit coater, or the like on a film to be abase material and then volatilizing water and a residual solvent. In this manner, a film according to the present invention, the film having: a base material; and on at least one face of the base material a polyhydroxyurethane coating film layer formed with the aqueous dispersion according to the first invention or the aqueous dispersion composition according to the second invention can be obtained.

The film material which is used as the base material above is not particularly limited, and all of the polymer materials which has been conventionally used as a packaging material can be used. Examples of the polymer materials include: polyolefin-based resins such as polyethylene, polypropylene, and polystyrene; polyester-based resins such as polyethylene terephthalate and polylactic acid; polyamide-based resins such as nylon-6 and nylon-66; and besides, copolymers of a polyimide or the like and these resins. In addition, if necessary, additives such as, for example, known antistatic agent, ultraviolet absorber, plasticizer, sliding agent, and colorant can be appropriately contained in these polymer materials.

EXAMPLES

Next, the present invention will be described in further detail giving specific Production Examples, Examples, and Comparative Examples, but the present invention is not limited to these Examples. It is to be noted that "parts" and "%" in the following examples are each on a mass basis unless otherwise noticed.

Production Example 1

Synthesis of Cyclic Carbonate-Containing Compound (I-A)

In a reaction container provided with a stirring apparatus and a condenser having an atmospheric air opening, 100 parts of bisphenol A diglycidyl ether having an epoxy equivalent of 192 (trade name: jER 828, manufactured by Japan Epoxy Resin), 20 parts of sodium iodide (manufactured by FUJIFILM Wako Pure Chemical Corporation), and 100 parts of N-methyl-2-pyrrolidone were loaded. Subsequently, carbon dioxide was continuously blown into the reaction container to perform a reaction at 100° C. for 10 hours while a resultant mixture was stirred. To a solution after the completion of the reaction, 140 parts of isopropanol was added to precipitate a reaction product as a white precipitate, and the white precipitate was separated by filtration. The obtained precipitate was subjected to recrystallization with toluene to obtain 52 parts of a white powder (yield was 42%).

The powder obtained above was analyzed with FT-720 (trade name, manufactured by HORIBA, Ltd., measurement was performed with the same apparatus in the following Production Examples), which is a Fourier transform infrared spectrophotometer (FT-IR), to find that the absorption at around 910 cm$^{-1}$ derived from an epoxy group in the raw material had disappeared, and the absorption derived from a carbonyl group in the carbonate group and not existing in the absorption of the raw material was ascertained at around 1800 cm$^{-1}$. In addition, as a result of analysis with LC-2000 (trade name, manufactured by JASCO Corporation, column: FinepakSIL C18-T5, mobile phase; acetonitrile+water), which is high-performance liquid chromatography (HPLC), it was found that the peak of the raw material had disappeared, a new peak had appeared on the high polarity side, and the purity was 98%. In addition, as a result of DSC measurement (differential scanning calorimetry), it was found that the melting point was 178° C., and the melting point range was ±5° C.

From those described above, it was ascertained that this powder is a compound in which a cyclic carbonate group is introduced by the reaction of the epoxy group and carbon dioxide, the compound having a structure represented by the following formula. This is abbreviated to I-A. The proportion of a component derived from carbon dioxide in the chemical structure of I-A was 20.5% (calculated value).

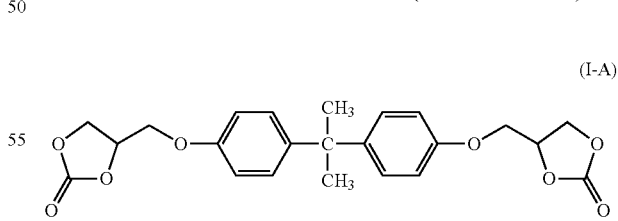

(I-A)

Production Example 2

Synthesis of Cyclic Carbonate-Containing Compound (I-B)

A cyclic carbonate compound having a structure represented by the following formula (I-B) was synthesized (yield was 55%) in the same manner as in Production Example 1 previously described except that hydroquinone diglycidyl ether having an epoxy equivalent of 115 (trade name: DENACOL EX203, manufactured by Nagase ChemteX Corporation) was used as the epoxy compound. The obtained I-B was a white crystal, and the melting point was 141° C. As a result of FT-IR analysis, it was found that the absorption at around 910 cm$^{-1}$ derived from the epoxy group in the raw material had disappeared, and the absorption derived from the carbonyl group in the carbonate group and not existing in the absorption of the raw material was ascertained at around 1800 cm−1, which were the same as in the case of I-A. The purity obtained from the HPLC analysis was 97%. The proportion of a component derived from carbon dioxide in the chemical structure of I-B was 28.0% (calculated value).

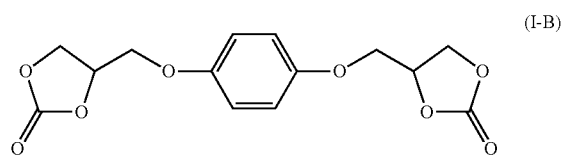 [SMILES: O=C1OCC(COc2ccc(OCC3COC(=O)O3)cc2)O1]

(I-B)

Production of Carboxyl Group-Containing Polyhydroxyurethane Resin Before Being Dispersed in Water Resin Synthesis Example 1 for Example In a reaction container provided with a stirring apparatus and a condenser having an atmospheric air opening, 10 parts of bisphenol A diglycidyl ether (trade name: jER 828, manufactured by Japan Epoxy Resin), 30.1 parts of hexamethylenediamine (manufactured by Tokyo Chemical Industry Co., Ltd.), and further, as a reaction solvent, 99 parts of tetrahydrofuran (hereinafter, abbreviated to THF) were added to perform a reaction at a temperature of 60° C. for 12 hours while a resultant mixture was stirred. Next, 100 parts of the cyclic carbonate-containing compound I-A obtained in Production Example 1 was put in to perform a reaction at a temperature of 60° C. for 24 hours while a resultant mixture was stirred. A resin solution after the reaction was analyzed by FT-IR to find that the absorption derived from the carbonyl group of the cyclic carbonate, which had been observed at around 1800 cm$^{-1}$, had disappeared perfectly, and the absorption derived from the carbonyl group of a urethane bond was ascertained newly at around 1760 cm$^{-1}$. The amine value measured using the obtained resin solution was 20.1 mgKOH/g as a value in terms of a resin content of 100%.

Subsequently, 124 parts of THF was added to this resin solution for dilution, 5.2 parts of maleic anhydride (manufactured by Tokyo Chemical Industry Co., Ltd.) was then added to perform a reaction at room temperature, the reaction was completed after it was ascertained by FT-IR that the peak at 1800 cm$^{-1}$ derived from the carbonyl group of the acid anhydride disappeared, and water was added to obtain a solution before being subjected to phase-transfer emulsification by addition of water, the solution containing a carboxyl group-containing polyhydroxyurethane resin having the structure specified in the present invention.

To check the physical properties of the obtained resin, the resin solution obtained above was applied on release paper with a bar coater so that the film thickness after drying was 50 μm to dry the solvent in an 80° C. oven, and the release paper was then peeled to obtain a resin film made of the resin obtained in Resin Synthesis Example 1. The appearance, mechanical strength, and oxygen transmission rate (gas-barrier property) of this resin film, the acid value of the resin, the hydroxyl value of the resin, and the molecular weight (GPC) were measured. Respective measurement methods will be described later. The results are shown in Table 1.

Resin Synthesis Example 2 for Example

A reaction container which is the same as the one used in Resin Synthesis Example 1 was used, and 22.4 parts of bisphenol A diglycidyl ether, 33.9 parts of hexamethylenediamine, and 114 parts of THF were added to perform a reaction in the same manner as in Resin Synthesis Example 1. Subsequently, 100 parts of I-A obtained previously was added to perform a reaction in the same manner as in Resin Synthesis Example 1. Results of checking the progress of the reaction for a resin solution after the reaction by FT-IR were similar to those in Resin Synthesis Example 1. The amine value of the obtained resin was 39.2 mgKOH/g as a value in terms of a resin content of 100%. Subsequently, 143 parts of THF was added for dilution, 11.4 parts of maleic anhydride was added to perform a reaction in the same manner as in Resin Synthesis Example 1, thereby introducing a carboxyl group being an ionic group to obtain a resin solution before being subjected to phase-transfer emulsification by addition of water. To check the physical properties of the obtained resin, a resin film was prepared in the same manner as in Resin Synthesis Example 1, and the appearance, mechanical strength, and oxygen transmission rate of the film, the acid value of the resin, the hydroxyl value of the resin, and the molecular weight (GPC) were measured. The results are shown in Table 1.

Resin Synthesis Example 3 for Example

A reaction container which is the same as the one used in Resin Synthesis Example 1 was used, and 22.4 parts of bisphenol A diglycidyl ether, 39.7 parts of meta-xylylenediamine (manufactured by MITSUBISHI GAS CHEMICAL COMPANY, INC.), and 118 parts of THF were added to perform a reaction in the same manner as in Resin Synthesis Example 1. Subsequently, 100 parts of I-A obtained previously was added to perform a reaction in the same manner as in Resin Synthesis Example 1. Results of checking the progress of the reaction for a resin solution after the reaction by FT-IR were similar to those in Resin Synthesis Example 1. The amine value of the obtained resin was 38.1 mgKOH/g as a value in terms of a resin content of 100%. Subsequently, 148 parts of THF was added for dilution, 11.4 parts of maleic anhydride was added to perform a reaction in the same manner as in Resin Synthesis Example 1, thereby introducing a carboxyl group being an ionic group to obtain a resin solution before being subjected to phase-transfer emulsification by addition of water. To check the physical properties of the obtained resin, a resin film was prepared in the same manner as in Resin Synthesis Example 1, and the appearance, mechanical strength, and oxygen transmission rate of the film, the acid value of the resin, the hydroxyl value of the resin, and the molecular weight (GPC) were measured. The results are shown in Table 1.

Resin Synthesis Example 4 for Example

A reaction container which is the same as the one used in Resin Synthesis Example 1 was used, and 22.4 parts of bisphenol A diglycidyl ether, 39.7 parts of meta-xylylenediamine, and 122 parts of THF were added to perform a reaction in the same manner as in Resin Synthesis Example 1. Subsequently, 100 parts of I-A obtained previously was added to perform a reaction in the same manner as in Resin Synthesis Example 1. Results of checking the progress of the reaction for a resin solution after the reaction by FT-IR were similar to those in Resin Synthesis Example 1. The amine value of the obtained resin was 38.1 mgKOH/g as a value in terms of a resin content of 100%. Subsequently, 152 parts of THF was added for dilution, 17.3 parts of phthalic anhydride was added to perform a reaction in the same manner as in Resin Synthesis Example 1, thereby introducing a carboxyl group being an ionic group to obtain a resin solution before being subjected to phase-transfer emulsification by addition of water. To check the physical properties of the obtained resin, a resin film was prepared in the same manner as in Resin Synthesis Example 1, and the appearance, mechanical strength, and oxygen transmission rate of the film, the acid value of the resin, the hydroxyl value of the resin, and the molecular weight (GPC) were measured. The results are shown in Table 1.

Resin Synthesis Example 5 for Example

A reaction container which is the same as the one used in Resin Synthesis Example 1 was used, and 8.2 parts of hydroquinone diglycidyl ether (trade name: DENACOL EX203, manufactured by Nagase ChemteX Corporation), 48.8 parts of meta-xylenediamine, and 111 parts of THF were added to perform a reaction in the same manner as in Resin Synthesis Example 1. Subsequently, 100 parts of I-B obtained previously was added to perform a reaction in the same manner as in Resin Synthesis Example 1. Results of checking the progress of the reaction for a resin solution after the reaction by FT-IR were similar to those in Resin Synthesis Example 1. The amine value of the obtained resin was 26.5 mgKOH/g as a value in terms of a resin content of 100%. Subsequently, 139 parts of THF was added for dilution, 7 parts of maleic anhydride was added to perform a reaction in the same manner as in Resin Synthesis Example 1, thereby introducing a carboxyl group being an ionic group to obtain a resin solution before being subjected to phase-transfer emulsification by addition of water. To check the physical properties of the obtained resin, a resin film was prepared in the same manner as in Resin Synthesis Example 1, and the appearance, mechanical strength, and oxygen transmission rate of the film, the acid value of the resin, the hydroxyl value of the resin, and the molecular weight (GPC) were measured. The results are shown in Table 1.

Resin Synthesis Example a for Comparative Example

A reaction container which is the same as the one used in Resin Synthesis Example 1 was used, and 4.7 parts of bisphenol A diglycidyl ether, 28.6 parts of hexamethylenediamine, and 93.2 parts of THF were added to perform a reaction in the same manner as in Resin Synthesis Example 1. Subsequently, 100 parts of I-A obtained previously was added to perform a reaction in the same manner as in Resin Synthesis Example 1. Results of checking the progress of the reaction for a resin solution after the reaction by FT-IR were similar to those in Resin Synthesis Example 1. The amine value of the obtained resin was 11.1 mgKOH/g as a value in terms of a resin content of 100%. Subsequently, 116 parts of THF was added for dilution, 2.4 parts of maleic anhydride was added to perform a reaction in the same manner as in Resin Synthesis Example 1, thereby obtaining a resin solution before being subjected to phase-transfer emulsification by addition of water. To check the physical properties of the obtained resin, a resin film was prepared in the same manner as in Resin Synthesis Example 1, and the appearance, mechanical strength, and oxygen transmission rate of the film, the acid value of the resin, the hydroxyl value of the resin, and the molecular weight (GPC) were measured. The results are shown in Table 1.

Resin Synthesis Example b for Comparative Example

A reaction container which is the same as the one used in Resin Synthesis Example 1 was used, and 59.8 parts of bisphenol A diglycidyl ether, 45.2 parts of hexamethylenediamine, and 198 parts of THF were added to perform a reaction in the same manner as in Resin Synthesis Example 1. Subsequently, when 100 parts of I-A obtained previously was added to perform a reaction in the same manner as in Resin Synthesis Example 1, the whole solution was solidified (gelation occurred) before the reaction was completed, and therefore the reaction was stopped. The gelled product which was obtained was a crosslinked body of a hydroxyurethane resin, and the evaluations of physical properties were not performed because a film was not able to be formed.

Resin Synthesis Example C for Comparative Example

In a reaction container which is the same as the one used in Resin Synthesis Example 1, 100 parts of the cyclic carbonate-containing compound I-A obtained in Production Example 1, 27.1 parts of hexamethylenediamine, and 198 parts of THF were added to perform a reaction at a temperature of 60° C. for 24 hours while a resultant mixture was stirred, and thus a resin solution for Comparative Example was obtained. The obtained resin solution is a usual polyhydroxyurethane resin not containing a carboxyl group. Subsequently, 117 parts of THF was added to the reaction solution for dilution, and 9.2 parts of maleic anhydride, and as a catalyst, 11.8 parts of triethylamine were then added to perform a reaction at 60° C. for 2 hours to react maleic anhydride, and thus a resin solution before being subjected to phase-transfer emulsification was obtained. This resin is a polyhydroxyurethane resin which is different from the polyhydroxyurethane resin specified in the present invention, which contains a carboxyl group introduced by making a hydroxy group into a half-ester, and which is obtained by a conventional formulation. To check the physical properties of the obtained resin, a resin film was prepared in the same manner as in Resin Synthesis Example 1, and the appearance, mechanical strength, and oxygen transmission rate of the film, the acid value of the resin, the hydroxyl value of the resin, and the molecular weight (GPC) were measured. The results are shown in Table 1.

Evaluations

Evaluations were performed according to the following methods and criteria for each resin obtained in Resin Synthesis Examples 1 to 5 for Examples and Resin Synthesis Examples a to c for Comparative Examples described above and each film prepared with each resin. The carbon oxide content for each resin was calculated in the following manner. Evaluation results are shown in Table 1 together.

Carbon Dioxide Content

The carbon dioxide content was determined by calculating the percentage (%) by mass of the segment which is derived from carbon dioxide in a raw material and which exists in the chemical structure of each polyhydroxyurethane resin used in each Synthesis Example. Specifically, the carbon dioxide content is shown by a calculated value calculated from the theoretical amount of carbon dioxide contained in the monomer used in synthesizing the compound I-A or I-B used for the reaction for synthesizing the polyhydroxyurethane resins. For example, in the case of Resin Synthesis Example 1 for Example, the amount of the component which is derived from carbon dioxide and which is in the compound 1-A used was 20.5%, and the carbon dioxide concentration in the polyurethane of Resin Synthesis Example 1 for Example is thereby (100 parts×20.5%)/145.3 being the whole amount=14% by mass.

Molecular Weight

In Table 1, the weight average molecular weight measured by GPC measurement using dimethylformamide (DMF) as a mobile phase is shown as the value in terms of polystyrene. The GPC measurement was performed using GPC-8220 (trade name) manufactured by Tosoh Corporation with a column; Super AW2500+AW3000+AW4000+AW5000.

Film Appearance

The total light transmittance and the haze were measured for each resin film prepared and evaluated according to the following criteria. Both of the total light transmittance and the haze were measured with a haze meter HZ-1 (trade name, manufactured by Suga Test Instruments Co., Ltd.) in accordance with JIS K-7105. All the quantity of light measured with the haze meter is the total light transmittance, and the proportion of diffuse transmission light in the total light transmittance is the haze.

Evaluation Criteria

Good: the total light transmittance is 90% or higher and the haze is 5% or lower
Poor: a resin film not satisfying Good Acid Value and Hydroxyl Value Both of the acid value and the hydroxyl value were measured by a titration method in accordance with JIS K-1557, and the content of each functional group per 1 gram of resin is represented by mg equivalent of KOH. It is to be noted that the unit is mg/KOH.

Mechanical Strength

Strength at breakage and elongation at breakage were measured as the mechanical strength of each resin film prepared. The measurement was performed in accordance with JIS K-6251 by a measurement method using Autograph AGS-J (trade name, manufactured by SHIMADZU CORPORATION) at room temperature (25° C.)

Gas-Barrier Property (Oxygen Transmission Rate)

The transmission rate of oxygen was measured in accordance with JIS K-7126 for each resin film prepared, and this was determined to be an evaluation value of the gas-barrier property. That is, it can be decided that the lower this value is, the more excellent the gas-barrier property is. Specifically, the oxygen transmission rate was measured using OX-TRAN 2/21ML (trade name, manufactured by MOCON Inc.), which is an oxygen transmission rate measurement apparatus, under a constant temperature and humidity condition in which the temperature was set to 23° C. and the humidity was set to 65%. It is to be noted that films which were used each have a film thickness of 50 μm after drying, and therefore the values in terms of a film thickness of 20 μm are described in Table 1.

TABLE 1

Physical properties of resins before phase-transfer emulsification and evaluation results of resin films

| Item (unit) | Resin Synthesis Examples for Examples | | | | | Resin Synthesis Examples for Comparative Examples | | |
|---|---|---|---|---|---|---|---|---|
| | 1 | 2 | 3 | 4 | 5 | a | b | c |
| Molecular weight (Mw) | 72000 | 71000 | 57000 | 55000 | 45000 | 44000 | Evaluation impossible because of gelation | 42000 |
| Acid value (mgKOH/g) | 20 | 38 | 37 | 36 | 24 | 10 | | 37 |
| Hydroxyl value (mgKOH/g) | 195 | 191 | 185 | 179 | 241 | 197 | | 112 |
| $CO_2$ content (% by mass) | 14 | 12 | 11.6 | 11.2 | 17 | 14.7 | | 14.6 |
| Film appearance | Good | Good | Good | Good | Good | Good | Evaluation impossible because of gelation | Good |
| Strength at breakage (MPa) | 63 | 60 | 17 | 20 | 21 | 40 | | 33 |
| Elongation at breakage (%) | 5 | 6 | 3 | 6 | 3 | 4 | | 7 |
| Gas-barrier property* | 15 | 16 | 9 | 12 | 3 | 20 | | 60 |

*Unit of gas-barrier property is (mL · 20 μm/m² · day · atm).
Values are in terms of film thickness of 20 μm.

First Invention

Production of Aqueous Dispersion

Example 1-1

In a reaction container with which stirring and reduced pressure distillation can be performed, 100 parts of the resin solution (THF solution) obtained in Resin Synthesis Example 1 for Example and 1.4 parts of triethylamine were loaded. Ion-exchanged water in an amount of 100 parts was added gradually to perform phase-transfer emulsification while a resultant mixture was stirred at room temperature.

Next, the reaction container was warmed to 50° C., the pressure was reduced to distil away THF, and an aqueous dispersion according to the present Example containing a polyhydroxyurethane resin dispersed in water was thereby obtained. The obtained aqueous dispersion had been adjusted so as to have a solid content of 30% and was an aqueous dispersion whose appearance was uniform. The particle size distribution of the dispersed particles of the polymer in the aqueous dispersion was measured with UPA-EX150 (trade name) manufactured by NIKKISO CO., LTD. to find d50=0.02 μm. The particle size distribution of the aqueous dispersion measured above is shown in FIG. 1. In addition, the obtained aqueous dispersion was stored in a thermostatic chamber of 50° C., and the stability thereof was evaluated to find that the aqueous dispersion exhibited favorable stability.

To the aqueous dispersion obtained above, 0.5 parts of PRIMAL RM-8W (trade name, manufactured by Rohm & Haas Japan K.K.) as a rheology modifier was added to prepare a paint. The obtained paint was used and applied on a base material described below to prepare a gas-barrier film. Specifically, a cast polypropylene film (CPP film) having a thickness of 40 μm and described below was used as the base material, the obtained paint was applied on a corona-treated surface of the base material so that the thickness after drying was 10 μm to be dried at 100° C., and thus a coating film layer was formed on the base material to obtain a multilayered film. The CPP film used as the base material is PYLEN P1111 (trade name) manufactured by Toyobo Co., Ltd. and had an oxygen transmission rate of 1500 mL40 μm/m$^2$·day·atm as an actual measured value. The paint film appearance, adhesiveness, water resistance, and gas-barrier property were evaluated using the obtained multilayered film. Respective measurement methods will be described later. Obtained results are shown in Table 2.

Example 1-2

To 100 parts of the resin solution obtained previously in Resin Synthesis Example 2 for Example, 2.8 parts of triethylamine was added, and phase-transfer emulsification was performed in the same manner as in Example 1-1 to obtain an aqueous dispersion according to the present Example. The obtained aqueous dispersion had been adjusted so as to have a solid content of 30% by addition of water and was an aqueous dispersion whose appearance was uniform. A paint was prepared using the obtained aqueous dispersion and, in the same manner as in Example 1-1, adding as a rheology modifier PRIMAL RM-8W, and a multilayered film was prepared using this paint with a base material which is the same as the one used in Example 1-1 under conditions which are the same as those in Example 1-1. Evaluations which are the same as those in Example 1-1 were performed with the aqueous dispersion and film according to the present Example obtained above, and the results are shown in Table 2.

Example 1-3

To 100 parts of the resin solution obtained previously in Resin Synthesis Example 3 for Example, 2.7 parts of triethylamine was added, and phase-transfer emulsification was performed in the same manner as in Example 1-1 to obtain an aqueous dispersion according to the present Example. The obtained aqueous dispersion had been adjusted so as to have a solid content of 30% by addition of water and was an aqueous dispersion whose appearance was uniform. A paint was prepared using the obtained aqueous dispersion and, in the same manner as in Example 1-1, adding as a rheology modifier PRIMAL RM-8W, and a multilayered film was prepared using this paint with a base material which is the same as the one used in Example 1-1 under conditions which are the same as those in Example 1-1. Evaluations which are the same as those in Example 1-1 were performed with the aqueous dispersion and film according to the present Example obtained above, and the results are shown in Table 2.

Example 1-4

To 100 parts of the resin solution obtained previously in Resin Synthesis Example 4 for Example, 2.6 parts of triethylamine was added, and phase-transfer emulsification was performed in the same manner as in Example 1-1 to obtain an aqueous dispersion according to the present Example. The obtained aqueous dispersion had been adjusted so as to have a solid content of 30% by addition of water and was an aqueous dispersion whose appearance was uniform. A paint was prepared using the obtained aqueous dispersion and, in the same manner as in Example 1-1, adding as a rheology modifier PRIMAL RM-8W, and a multilayered film was prepared using this paint with a base material which is the same as the one used in Example 1-1 under conditions which are the same as those in Example 1-1. Evaluations which are the same as those in Example 1-1 were performed with the aqueous dispersion and film according to the present Example obtained above, and the results are shown in Table 2.

Example 1-5

To 100 parts of the resin solution obtained previously in Resin Synthesis Example 5 for Example, 1.7 parts of triethylamine was added, and phase-transfer emulsification was performed in the same manner as in Example 1-1 to obtain an aqueous dispersion according to the present Example. The obtained aqueous dispersion had been adjusted so as to have a solid content of 30% by addition of water and was an aqueous dispersion whose appearance was uniform. A paint was prepared using the obtained aqueous dispersion and, in the same manner as in Example 1-1, adding as a rheology modifier PRIMAL RM-8W, and a multilayered film was prepared using this paint with a base material which is the same as the one used in Example 1-1 under conditions which are the same as those in Example 1-1. Evaluations which are the same as those in Example 1-1 were performed with the aqueous dispersion and film according to the present Example obtained above, and the results are shown in Table 2.

Example 1-6

Phase-transfer emulsification was performed using the resin solution obtained previously in Resin Synthesis Example 1 for Example to obtain an aqueous dispersion. In the present Example, to 100 parts of the obtained aqueous dispersion (solid content of 23%), 5 parts of DURANATE WB40-100 (trade name, manufactured by Asahi Kasei Chemicals Corporation, NCO %=16.6%), which is an isocyanate-based crosslinking agent, was added as a crosslinking agent, and a resultant mixture was dispersed with a disper to prepare a paint. A multilayered film was prepared using this paint with a base material which is the same as the one used in Example 1-1 under conditions which are the same as those in Example 1-1. The obtained film was subjected to an aging treatment of 40° C. for 2 days, and the paint film appearance, adhesiveness, water resistance, and gas-barrier property of the multilayered film were thereafter evaluated in the same manner as in Example 1-1. The results are shown in Table 3. The results for the multilayered film of Example 1-1 are shown together in Table 3.

Example 1-7

A paint was prepared in the same manner as in Example 1-6 except that the crosslinking agent used in Example 1-6 was changed to 5 parts of CARBODILITE V-02 (trade name, manufactured by Nisshinbo Chemical Inc., NCN equivalent of 590), which is a carbodiimide-based crosslinking agent. A multilayered film was prepared using this paint with a base material which is the same as the one used in Example 1-1 under conditions which are the same as those in Example 1-1, the obtained film was subjected to an aging treatment of 100° C. for 30 minutes, and the paint film appearance, adhesiveness, water resistance, and gas-barrier property of the multilayered film were thereafter evaluated in the same manner as in Example 1-1. The results are shown in Table 3.

Comparative Example 1-1

The operation of phase-transfer emulsification was performed using the resin solution obtained in Resin Synthesis Example a for Comparative Example in the same manner as in Example 1-1. As a result, the particle diameters at the time of the phase-transfer emulsification were large and the resin settled into a separation state, and when the operation of removing THF was performed, the resin was made into lumps and was separated completely. Therefore, preparation of a multilayered film was not performed.

Comparative Example 1-2

Phase-transfer emulsification was attempted using Resin Synthesis Example b for Comparative Example. However, the resin solution synthesized in Synthesis Example b was in the form of gel, the gel state was not resolved even when water was added, and therefore phase-transfer emulsification was not able to be performed.

Comparative Example 1-3

An aqueous dispersion was obtained in the same manner as in Example 1-1 except that triethylamine, which had already been used at the time of the reaction, was not added to the resin solution obtained in Resin Synthesis Example c for Comparative Example. A paint was prepared using the obtained aqueous dispersion and, in the same manner as in Example 1-1, adding PRIMAL RM-8W. A multilayered film was prepared using this paint with a base material which is the same as the one used in Example 1-1 under conditions which are the same as those in Example 1-1. Evaluations which are the same as those in Example 1-1 were performed with the aqueous dispersion and the film according to the present Comparative Example obtained above, and the results are shown in Table 2.

Evaluations

Evaluations of properties of each aqueous dispersion obtained above in Examples 1-1 to 1-7 and Comparative Examples 1-1 to 1-3, and evaluations of each film prepared with each paint obtained using each aqueous dispersion were performed according to the following methods and criteria. The results are shown together in Tables 2 and 3.

Particle Diameter

The particle size distribution was measured for each aqueous dispersion of Examples 1-1 to 1-5 and Comparative Example 1-3 using a dynamic light scattering type Nanotrack particle size distribution analyzer UPA-EX150 (trade name) manufactured by NIKKISO CO., LTD. The median diameter (=d50 value) obtained by calculation from the measured particle size distribution is shown in Table 2 as the particle diameter.

Stability

Each aqueous dispersion of Examples 1-1 to 1-5 and Comparative Example 1-3 was put into a sealed plastic container and stored in a thermostatic chamber of 50° C. The states after a lapse of 1 month, 3 months, and 6 months were observed and evaluated according to the following criteria, and the results are shown in Table 2.

Evaluation Criteria

Good: sedimentation of particles is not observed, and a change in appearance is not observed
Fair: particles settle but are easily redispersed by stirring
Poor: emulsified particles are broken and a resin component settles; and the resin component cannot be redispersed even when it is stirred.

Paint Film Appearance

The appearance of an applied face was observed visually for each multilayered film prepared in Examples 1-1 to 1-7 and Comparative Example 1-3 and evaluated according to the following criteria. The results are shown in Tables 2 and 3.

Evaluation Criteria

Good: the surface of a paint film is transparent, uniform, and glossy
Fair: the surface of a paint film lacks gloss and is cloudy
Poor: unevenness due to collection of substances exists Adhesiveness A cellophane tape was press-bonded to a portion of the surface of a paint film, the cellophane tape was then peeled by hand slowly, and the degree of peeling was observed for each multilayered film prepared in Examples 1-1 to 1-7 and Comparative Example 1-3 and was evaluated according to the following criteria. The results are shown in Table 2 and Table 3.

Evaluation Criterial

Good: a paint film was not peeled
Fair: part of a paint film was peeled
Poor: a paint film was peeled completely Water Resistance Each multilayered film prepared in Examples 1-1 to 1-7 and Comparative Example 1-3 was immersed in water, and the state of the surface of a paint film after a lapse of 24 hours at room temperature was observed visually and evaluated according to the following criteria. The results are shown in Table 2 and Table 3.

Evaluation Criteria

Good: a change is not observed
Fair: part of a paint film is whitened
Poor: a paint film is swollen

Solvent Resistance

Several drops of tetrahydrofuran were dropped with a dropper on the surface of a paint film for each multilayered film prepared in Examples 1-1, 1-6, and 1-7, and the dropped tetrahydrofuran was wiped immediately with waste cloth. The state of the surface of the paint film after the wipe was observed visually and evaluated according to the following criteria. The results are shown in Table 3.

Evaluation Criteria

Good: a change was not observed
Fair: a wiping mark is left on a paint film
Poor: part of a paint film was peeled

Gas-Barrier Property

The transmission rate of oxygen was measured in accordance with JIS K-7126 for each film prepared in Examples 1-1 to 1-7 and Comparative Example 1-3, and this was determined to be an evaluation value of the gas-barrier property. That is, it can be decided that the lower this value is, the more excellent the gas-barrier property is. Specifically, the oxygen permeability (oxygen transmission rate) was measured using OX-TRAN 2/21ML (trade name, manufactured by MOCON Inc.), which is an oxygen transmission rate measurement apparatus, under a constant temperature and humidity condition in which the temperature was set to 23° C. and the humidity was set to 65%. It is to be noted that the oxygen transmission rates, which are shown previously in Table 1, of the films prepared in Resin Synthesis Examples 1 to 5 for Examples and Resins a and c for Comparative Examples are values in terms of a film thickness of 20 μm, but on the other hand, the measured values of the gas-barrier property, which are shown in Table 2 and Table 3, of the films of Examples 1-1 to 1-7 and Comparative Example 1-3 are the oxygen permeabilities as film formations. In the films, the thickness of a coating layer obtained by applying each paint of Examples and Comparative Example was actually measured using a precision thickness gauge (manufactured by OZAKI MFG. CO., LTD.), and it is ascertained that the thicknesses are each 10 μm. The results are shown in Table 2 and Table 3.

TABLE 3

Evaluation results of resin films obtained using aqueous dispersions of Examples (Study on use of crosslinking agent)

|  | Example 1-1 | Example 1-6 | Example 1-7 |
|---|---|---|---|
| Use of crosslinking agent | Not used | Isocyanate-based | Carbodiimide-based |
| Paint film appearance | Good | Good | Good |
| Adhesiveness | Fair | Good | Good |
| Water resistance | Good | Good | Good |
| Solvent resistance (THF) | Poor | Good | Good |
| Gas-barrier property | 29 | 30 | 30 |

* Unit of gas-barrier property is (mL/m$^2$ · day · atm)

As shown in Table 1, in any of the hydroxyurethane resins which were used for aqueous dispersions of Examples according to the present invention and which were before being subjected to phase-transfer emulsification by addition of water, the carboxyl group is introduced without decreasing the amount of the hydroxy group when comparison is made with the hydroxy urethane resin for Comparative Example 1-3 obtained by a conventional formulation of Resin Synthesis Example c for Comparative Example. As a result, it was ascertained that, as shown in Table 2, each resin for Example according to the present invention can reduce lowering of the mechanical strength exhibited by cohesive force of the hydroxy groups and has a high gas-barrier property.

In addition, as shown in Table 2, in Examples according to the present invention, stable aqueous dispersions having a small particle diameter can be prepared by introducing the carboxyl group in the structure of the hydroxyurethane resin before being subjected to phase-transfer emulsification by addition of water. With respect to the storage stability in particular, a longer time period of storage is enabled when comparison is made with the aqueous dispersion (Comparative Example 1-3) prepared with a conventional formulation. This is due to the fact that in the conventional aqueous dispersions, the introduction of a carboxyl group has been performed by a half-ester, and therefore a carboxyl group-modified moiety is detached due to hydrolysis, but on the other hand, it is hard for the polyhydroxyurethane resins which are used in Examples according to the present invention and in which the carboxyl group is introduced through an amide bond to undergo hydrolysis. In addition, as shown in Table 3, with the aqueous dispersions according to the first invention, crosslinked coating films using various crosslink-

TABLE 2

Evaluation results of aqueous dispersions of Examples and Comparative Examples and resin films using same

|  | Examples | | | | | Comparative Examples | | |
|---|---|---|---|---|---|---|---|---|
|  | 1-1 | 1-2 | 1-3 | 1-4 | 1-5 | 1-1 | 1-2 | 1-3 |
| Particle diameter d50 (μm) | 0.02 | 0.009 | 0.009 | 0.015 | 0.01 | cannot be emulsified (evaluation impossible) | cannot be emulsified (evaluation impossible) | 0.01 |
| Stability  1 month | Good | Good | Good | Good | Good |  |  | Poor |
| 3 months | Good | Good | Good | Good | Good |  |  | — |
| 6 months | Good | Good | Good | Good | Good |  |  | — |
| Paint film appearance | Good | Good | Good | Good | Good |  |  | Good |
| Adhesiveness | Fair | Fair | Fair | Fair | Fair |  |  | Fair |
| Water resistance | Good | Good | Good | Good | Good |  |  | Good |
| Gas-barrier property* | 29 | 31 | 18 | 23 | 6 |  |  | 103 |

*Unit of gas-barrier property is (mL/m$^2$ · day · atm)

Second Invention

In the second invention, the resin solutions which were obtained in Resin Synthesis Examples 1 to 3 and 5 for Examples, which are described previously, and which were before being subjected to phase-transfer emulsification, and the resin solutions obtained by the methods of Resin Synthesis Examples d and e for Comparative Examples, which will be described below, were used. The resin solutions obtained in Resin Synthesis Examples d and e for Comparative Examples, which will be described below, and resin films obtained using these resin solutions were also evaluated by the methods described previously. In Table 4, the physical properties and evaluation results of the resin solutions which were obtained in Resin Synthesis Examples 1 to 3 and 5 for Examples, which were described previously, and which were before being subjected to phase-transfer emulsification, the evaluation results of the resin films obtained using these resin solutions, the physical properties of the resin solutions obtained in Resin Synthesis Examples d and e for Comparative Examples, and the evaluation results of the resin films using these resin solutions are shown together.

Resin Synthesis Example d for Comparative Example

In a reaction container which is the same as the one used in Resin Synthesis Example 1 described previously, 100 parts of the cyclic carbonate-containing compound I-A obtained in Production Example 1 described previously, 27.1 parts of hexamethylenediamine, and 198 parts of THF were added to perform a reaction at a temperature of 60° C. for 24 hours while a resultant mixture was stirred, and thus a resin solution for Comparative Example was obtained. The obtained resin solution is a usual polyhydroxyurethane resin not containing a carboxyl group. Subsequently, 117 parts of THF was added to the reaction solution for dilution, and 9.2 parts of maleic anhydride, and as a catalyst, 11.8 parts of triethylamine were then added to perform a reaction at 60° C. for 2 hours to react maleic anhydride, and thus a resin solution before being subjected to phase-transfer emulsification was obtained. This resin is a polyhydroxyurethane resin which is different from the polyhydroxyurethane resin specified in the present invention, which contains a carboxyl group introduced by making a hydroxy group into a half-ester, and which is obtained by a conventional formulation. To check the physical properties of the obtained resin, a resin film was prepared in the same manner as in Resin Synthesis Example 1 described previously, and the appearance, mechanical strength, and oxygen transmission rate of the film, the acid value of the resin, the hydroxyl value of the resin, and the molecular weight (GPC) were measured, and the results are shown in Table 4.

Resin Synthesis Example e for Comparative Example

In a reaction container which is the same as the one used in Resin Synthesis Example 1 described previously, 100 parts of the cyclic carbonate-containing compound I-B obtained in Production Example 2, 31.8 parts of meta-xylenediamine, and 96.8 parts of THF were added to perform a reaction at a temperature of 60° C. for 24 hours while a resultant mixture was stirred, and thus a resin solution for Comparative Example was obtained. The obtained resin solution is a usual polyhydroxyurethane resin not containing a carboxyl group. Subsequently, 121 parts of THF was added to the reaction solution for dilution, and 9.2 parts of maleic anhydride, and as a catalyst, 9.4 parts of triethylamine were then added to perform a reaction at 60° C. for 2 hours to react maleic anhydride, and thus a resin solution before being subjected to phase-transfer emulsification was obtained. This resin is a polyhydroxyurethane resin which is different from the polyhydroxyurethane resin specified in the present invention, which contains a carboxyl group introduced by making a hydroxy group into a half-ester, and which is obtained by a conventional formulation. To check the physical properties of the obtained resin, a resin film was prepared in the same manner as in Resin Synthesis Example 1 described previously, and the appearance, mechanical strength, and oxygen transmission rate of the film, the acid value of the resin, the hydroxyl value of the resin, and the molecular weight (GPC) were measured, and the results are shown in Table 4.

TABLE 4

Evaluation results of resins before being subjected to phase-transfer emulsification or resin films

| Item (unit) | Resin Synthesis Examples for Examples | | | | Resin Synthesis Examples for Comparative Examples | |
|---|---|---|---|---|---|---|
| | 1 | 2 | 3 | 5 | d | e |
| Molecular weight (Mw) | 72000 | 71000 | 57000 | 45000 | 44000 | 29000 |
| Acid value (mgKOH/g) | 20 | 38 | 37 | 24 | 38 | 36 |
| Hydroxyl value (mgKOH/g) | 195 | 191 | 185 | 241 | 115 | 108 |
| CO2 content (% by mass) | 14 | 12 | 11.6 | 17 | 15.1 | 14.1 |
| Film appearance | Good | Good | Good | Good | Good | Good |
| Strength at breakage (MPa) | 63 | 60 | 17 | 21 | 40 | 25 |
| Elongation at breakage (%) | 5 | 6 | 3 | 3 | 4 | 4 |
| Gas-barrier property* | 15 | 16 | 9 | 3 | 60 | 42 |

*Unit of gas-barrier property is (mL · 20 μm/m² · day · atm).
Values are in terms of film thickness of 20 μm.

Preparation of Clay Mineral

Production Example 3

Preparation of Clay Mineral-Dispersed Liquid B1

Preliminary mixing of 95 parts of water and, as a clay mineral, 5 parts of KUNIPIA F (trade name, manufactured by KUNIMINE INDUSTRIES CO., LTD.), which is a montmorillonite, was performed using a high-speed stirrer, homo disper, and swelling the interlayers of the clay mineral and dispersing the clay mineral were thereafter performed using an ultrasonic disperser (manufactured by Sonic Technology Co., Ltd.). It was ascertained that the clay mineral was dispersed uniformly, and a resultant dispersion liquid is denoted as a clay mineral-dispersed liquid B1.

Production Example 4

Preparation of Clay Mineral-Dispersed Liquid B2

Preliminary mixing of 95 parts of water and, as a clay mineral, 5 parts of Somacif ME-100 (trade name, manufactured by Co-op Chemical Co., Ltd.), which is synthesized mica, was performed using a homo disper, and a dispersion liquid of the clay mineral was thereafter obtained in the same manner as in Production Example 3 using an ultrasonic disperser. This is denoted as a clay mineral-dispersed liquid B2.

Example 2-1

Production of Aqueous Polyhydroxyurethane Resin Dispersion

In a reaction container with which stirring and reduced pressure distillation can be performed, 100 parts of the resin solution (THF solution) obtained in Resin Synthesis Example 1 for Example and 1.4 parts of triethylamine were loaded. Ion-exchanged water in an amount of 100 parts was added gradually to perform phase-transfer emulsification while a resultant mixture was stirred at room temperature. Next, the reaction container was warmed to 50° C., the pressure was reduced to distil away THF, and an aqueous dispersion containing a polyhydroxyurethane resin dispersed in water was thereby obtained. The obtained aqueous dispersion had been adjusted so as to have a solid content of 30% and was an aqueous dispersion whose appearance was uniform. The particle size distribution of the dispersed particles of the polymer in the aqueous dispersion (measured with UPA-EX150 (trade name) manufactured by NIKKISO CO., LTD., the same apparatus was used hereinafter) was found to be d50=0.02 μm.

Production of Clay Mineral-Containing Aqueous Polyhydroxyurethane Resin Dispersion Composition An aqueous dispersion composition of a composite material according to the present Example, the composition containing a polyhydroxyurethane resin and a clay mineral each dispersed in water was obtained by mixing 10 parts of the aqueous polyhydroxyurethane resin dispersion (solid content of 30%) obtained above and 10 parts of the clay mineral-dispersed liquid B1 (solid content of 5%) prepared in Production Example 3 and stirring a resultant mixture uniformly with a homo disper. The obtained aqueous dispersion composition was stored in a thermostatic chamber of 50° C. and the stability thereof was evaluated by the method which will be described later to find that the aqueous dispersion composition exhibited favorable stability.

A multilayered film was obtained in the manner as described below using the clay mineral-containing aqueous polyhydroxyurethane resin dispersion composition obtained above. Specifically, the clay mineral-containing aqueous polyhydroxyurethane resin dispersion composition obtained above was applied on a corona-treated face of PYLEN P1111 (trade name, manufactured by Toyobo Co., Ltd., actual measured value of oxygen transmission rate: 1500 mL20 μm/m$^2$·day·atom), which is a cast polypropylene film (CPP) film having a thickness of 40 μm, so that the film thickness after drying was 5 μm to be dried at 100° C., and a paint film (coating film layer) was thereby formed on the base material to obtain a multilayered film. The storage stability of the aqueous dispersion composition used was evaluated, and the paint film appearance, the total light transmittance, the surface gloss, and the gas-barrier property were evaluated using the film obtained above. Respective measurement methods will be described later. The results are shown in Table 5.

Example 2-2

An aqueous dispersion composition according to the present Example containing a polyhydroxyurethane resin and a clay mineral each dispersed therein was obtained by mixing 10 parts of the aqueous polyhydroxyurethane resin dispersion obtained by the same combination and in the same manner as in Example 2-1 and 20 parts of the clay mineral-dispersed liquid B1 (solid content of 5%) prepared in Production Example 3 and stirring a resultant mixture uniformly with a homo disper. A multilayered film was prepared using the obtained aqueous dispersion composition with a base material which is the same as the one used in Example 2-1 under conditions which are the same as those in Example 2-1. Evaluations which are the same as those in Example 2-1 were performed with the aqueous dispersion composition and the film according to the present Example obtained above, and the results are shown in Table 5.

Example 2-3

An aqueous dispersion composition according to the present Example containing a polyhydroxyurethane resin and a clay mineral each dispersed therein was obtained by mixing 10 parts of the aqueous polyhydroxyurethane resin dispersion obtained by the same combination and in the same manner as in Example 2-1 and 30 parts of the clay mineral-dispersed liquid B1 (solid content of 5%) prepared in Production Example 3 and stirring a resultant mixture uniformly with a homo disper. A multilayered film was prepared using the obtained aqueous dispersion composition with a base material which is the same as the one used in Example 2-1 under conditions which are the same as those in Example 2-1. Evaluations which are the same as those in Example 2-1 were performed with the aqueous dispersion composition and the film according to the present Example obtained above, and the results are shown in Table 5.

Example 2-4

An aqueous dispersion composition according to the present Example containing a polyhydroxyurethane resin and a clay mineral each dispersed therein was obtained by mixing 10 parts of the aqueous polyhydroxyurethane resin dispersion obtained by the same combination and in the same manner as in Example 2-1 and 60 parts of the clay mineral-dispersed liquid B1 (solid content of 5%) prepared in Production Example 3 and stirring a resultant mixture uniformly with a homo disper. A multilayered film was prepared using the obtained aqueous dispersion composition with a base material which is the same as the one used in Example 2-1 under conditions which are the same as those in Example 2-1. Evaluations which are the same as those in Example 2-1 were performed with the aqueous dispersion composition and the film according to the present Example obtained above, and the results are shown in Table 5.

Example 2-5

Phase-transfer emulsification was performed and an aqueous dispersion according to the present Example containing a polyhydroxyurethane resin dispersed therein was obtained in the same manner as in Example 2-1 except that 100 parts of the resin solution obtained in Resin Synthesis Example 2 for Example was used in place of the resin solution which was used in "Production of Aqueous Polyhydroxyurethane Resin Dispersion" of Example 2-1 and which was obtained in Resin Synthesis Example 1, and the amount of triethylamine was changed to 2.8 parts. The obtained aqueous dispersion had been adjusted so as to have a solid content of 30% by addition of water and was an aqueous dispersion whose appearance was uniform. Subsequently, an aqueous dispersion composition according to the present Example containing a polyhydroxyurethane resin and a clay mineral each dispersed therein was obtained by mixing 10 parts of the aqueous polyhydroxyurethane resin dispersion (solid content of 30%) obtained above and 30 parts of the clay mineral-dispersed liquid B1 (solid content of 5%) prepared in Production Example 3 and stirring a resultant mixture uniformly with a homo disper. A multilayered film was prepared using the obtained aqueous dispersion composition with a base material which is the same as the one used in Example 2-1 under conditions which are the same as those in Example 2-1. Evaluations which are the same as those in Example 2-1 were performed with the aqueous dispersion composition and the film according to the present Example obtained above, and the results are shown in Table 5.

Example 2-6

Phase-transfer emulsification was performed and an aqueous dispersion according to the present Example containing a polyhydroxyurethane resin dispersed therein was obtained in the same manner as in Example 2-1 except that 100 parts of the resin solution obtained in Resin Synthesis Example 3 for Example was used in place of the resin solution which was used in "Production of Aqueous Polyhydroxyurethane Resin Dispersion" of Example 2-1 and which was obtained in Resin Synthesis Example 1, and the amount of triethylamine was changed to 2.7 parts. The obtained aqueous dispersion had been adjusted so as to have a solid content of 30% by addition of water and was an aqueous dispersion whose appearance was uniform. Subsequently, an aqueous polyhydroxyurethane dispersion composition according to the present Example containing a polyhydroxyurethane resin and a clay mineral each dispersed therein was obtained by mixing 10 parts of the aqueous polyhydroxyurethane resin dispersion (solid content of 30%) obtained above and 30 parts of the clay mineral-dispersed liquid B2 (solid content of 5%) prepared in Production Example 4 and stirring a resultant mixture uniformly with a homo disper. A multilayered film was prepared using the obtained aqueous dispersion composition with a base material which is the same as the one used in Example 2-1 under conditions which are the same as those in Example 2-1. Evaluations which are the same as those in Example 2-1 were performed with the aqueous dispersion composition and the film according to the present Example obtained above, and the results are shown in Table 5.

Example 2-7

Phase-transfer emulsification was performed and an aqueous dispersion according to the present Example containing a polyhydroxyurethane resin dispersed therein was obtained in the same manner as in Example 2-1 except that 100 parts of the resin solution obtained in Resin Synthesis Example 5 for Example was used in place of the resin solution which was used in "Production of Aqueous Polyhydroxyurethane Resin Dispersion" of Example 2-1 and which was obtained in Resin Synthesis Example 1, and the amount of triethylamine was changed to 2.6 parts. The obtained aqueous dispersion had been adjusted so as to have a solid content of 30% by addition of water and was an aqueous dispersion whose appearance was uniform. Subsequently, an aqueous dispersion composition according to the present Example containing a polyhydroxyurethane resin and a clay mineral each dispersed therein was obtained by mixing 10 parts of the aqueous polyhydroxyurethane resin dispersion (solid content of 30%) obtained above and 30 parts of the clay mineral-dispersed liquid B2 (solid content of 5%) prepared in Production Example 4 and stirring a resultant mixture uniformly with a homo disper. A multilayered film was prepared using the obtained aqueous dispersion composition with a base material which is the same as the one used in Example 2-1 under conditions which are the same as those in Example 2-1. Evaluations which are the same as those in Example 2-1 were performed with the aqueous dispersion composition and the film according to the present Example obtained above, and the results are shown in Table 5.

Comparative Example 2-1

An aqueous polyhydroxyurethane resin dispersion in which the solid content was adjusted to 30% was obtained in the same manner as in Example 2-1 except that the resin solution obtained in Resin Synthesis Example d for Comparative Example was used in place of the resin solution which was used in "Production of Aqueous Polyhydroxyurethane Resin Dispersion" of Example 2-1 and which was obtained in Resin Synthesis Example 1, and triethylamine, which had already been used at the time of the reaction, was not used. The particle size distribution of the dispersed particles of the polymer in the aqueous dispersion was found to be d50=0.020 μm. Subsequently, an aqueous dispersion composition according to Comparative Example containing a polyhydroxyurethane resin and a clay mineral each dispersed therein was obtained by mixing 10 parts of the obtained aqueous polyhydroxyurethane resin dispersion (solid content of 30%) and 30 parts of the clay mineral-dispersed liquid B1 (solid content of 5%) prepared in Production Example 3 and stirring a resultant mixture uniformly with a homo disper. A multilayered film was prepared using the obtained aqueous dispersion composition with a base material which is the same as the one used in Example 2-1 under conditions which are the same as those in Example 2-1. Evaluations which are the same as those in Example 2-1 were performed with the aqueous dispersion composition and the film according to the Comparative Example obtained above, and the results are shown in Table 6.

Comparative Example 2-2

An aqueous polyhydroxyurethane resin dispersion in which the solid content was adjusted to 30% was obtained in the same manner as in Example 2-1 except that the resin solution obtained in Resin Synthesis Example e for Comparative Example was used in place of the resin solution which was used in "Production of Aqueous Polyhydroxyurethane Resin Dispersion" of Example 2-1 and which was obtained in Resin Synthesis Example 1, and triethylamine, which had already been used at the time of the reaction, was not used. The particle size distribution of the dispersed particles of the polymer in the aqueous dispersion was found to be d50=0.020 μm. Subsequently, an aqueous dispersion composition according to Comparative Example containing a polyhydroxyurethane resin and a clay mineral each dispersed therein was obtained by mixing 10 parts of the obtained aqueous polyhydroxyurethane resin dispersion (solid content of 30%) and 30 parts of the clay mineral-dispersed liquid B1 (solid content of 5%) prepared in Production Example 3 and stirring a resultant mixture uniformly with a homo disper. A multilayered film was prepared using the obtained aqueous dispersion composition with a base material which is the same as the one used in Example 2-1 under conditions which are the same as those in Example 2-1. Evaluations which are the same as those in Example 2-1 were performed with the aqueous dispersion composition and the film according to Comparative Example obtained above, and the results are shown in Table 6.

Evaluations

Evaluations of properties of each aqueous dispersion composition of Examples 2-1 to 2-7 and Comparative Examples 2-1 and 2-2 obtained above, and evaluations of each film prepared with each aqueous dispersion composition in the manner as described previously were performed according to the following methods and criteria. The results are shown together in Tables 5 and 6.

Stability

Each aqueous dispersion composition of Examples 2-1 to 2-7 and Comparative Examples 2-1 and 2-2 was put into a sealed plastic container and stored in a thermostatic chamber of 50° C. The states after a lapse of 1 month, 3 months, and 6 months were observed and evaluated according to the following criteria, and the results are shown in Tables 5 and 6.

Evaluation Criteria

Good: sedimentation of polymer particles and of a clay mineral are not observed, and a change in appearance is not observed.
Fair: polymer particles and a clay mineral settle but are easily redispersed by stirring.
Poor: emulsified particles are broken and a resin component settles; and the resin component cannot be redispersed even when it is stirred.

Paint Film Appearance

The appearance of an applied face (coating layer) was observed visually for each multilayered film prepared in Examples 2-1 to 2-7 and Comparative Examples 2-1 and 2-2 and evaluated according to the following criteria. The results are shown in Tables 5 and 6.

Evaluation Criteria

Good: a transparent to semitransparent, uniform coating film is formed, and an aggregate which can be ascertained visually does not exist.
Poor: a coating film is ununiform because of a streak or the like due to an aggregate, or an aggregate which can be observed visually exists.

Total Light Transmittance: Haze

Measurement was performed using a digital haze meter HGM-2DP (trade name, manufactured by Suga Test Instruments Co., Ltd.) by a method which is in accordance with JIS K-7136.

Water Resistance

Each multilayered film prepared in Examples 2-1 to 2-7 and Comparative Examples 2-1 and 2-2 was immersed in water, and the state of the surface of a paint film after a lapse of 1 hour at room temperature was observed visually and evaluated according to the following criteria. The results are shown in Tables 5 and 6.

Evaluation Criteria

Good: a change is not observed
Fair: part of a paint film is whitened
Poor: a paint film is swollen Gas-Barrier Property The transmission rate of oxygen was measured in accordance with JIS K-7126 for each film having a paint film (coating layer) on the surface thereof, the film prepared using each aqueous dispersion composition of Examples 2-1 to 2-7 and Comparative Examples 2-1 and 2-2, and this was determined to be an evaluation value of a gas-barrier property. That is, it can be decided that the lower this value is, the more excellent the gas-barrier property is. Specifically, the oxygen permeability (oxygen transmission rate) was measured using an oxygen transmission rate measurement apparatus under a constant temperature and humidity condition in which the temperature was set to 23° C. and the humidity was set to 65%. It is to be noted that the oxygen transmission rates, which are shown previously in Table 4, of the films prepared in Resin Synthesis Examples 1 to 3 and 5 for Examples are values in terms of a film thickness of 20 μm, but on the other hand, the measured values, which are shown in Tables 5 and 6, of the gas-barrier property of the resin films of Examples 2-1 to 2-7 and Comparative Examples 2-1 and 2-2 are the oxygen permeabilities as film formations each having a paint film (coating layer/coating film layer) on the surface thereof. In the films, the thickness of a coating layer obtained by applying each aqueous dispersion composition of Examples 2-1 to 2-7 and Comparative Examples 2-1 and 2-2 was actually measured using a precision thickness gauge (manufactured by OZAKI MFG. CO., LTD.), and it is ascertained that the thicknesses are each 5 μm. The results are shown in Tables 5 and 6. It is to be noted that for reference, a film having a paint film (coating layer) formed on the surface thereof was prepared in the same manner as described above using each aqueous polyhydroxyurethane resin dispersion (solid content of 30%) before a composite was made with a clay mineral, the aqueous polyhydroxyurethane resin dispersion used for preparing each aqueous dispersion composition, so that the thickness of the coating layer was 5 µm, and the gas-barrier property thereof was measured. The results are shown in the lowest row in Tables 5 and 6.

in the polyhydroxyurethane resin having a structure specified in the present invention, penetration of the polymer chain in the interlayers of a clay mineral was not inhibited due to the existence of this amide bond, and therefore a uniform dispersion can be produced. As a result, it was ascertained that as shown in Table 5, any of the paint films (coating film layers) formed using aqueous dispersion compositions of Examples 2-1 to 2-7 has excellent transparency

TABLE 5

Formulations of compositions of Examples and evaluation results of resin films using same

|  |  | Example 2-1 | Example 2-2 | Example 2-3 | Example 2-4 | Example 2-5 | Example 2-6 | Example 2-7 |
|---|---|---|---|---|---|---|---|---|
| Aqueous dispersion composition | (1) Resin Synthesis Example No. | 1 | 1 | 1 | 1 | 2 | 3 | 5 |
|  | (2) Clay mineral-dispersed liquid | B1 | B1 | B1 | B1 | B1 | B2 | B2 |
|  | Mass ratio of (1)/(2) | 100/16 | 100/33 | 100/50 | 100/100 | 100/50 | 100/50 | 100/50 |
|  | Evaluation of stability  1 month | Good | Good | Good | Good | Good | Good | Good |
|  | 3 months | Good | Good | Good | Good | Good | Good | Good |
|  | 6 months | Good | Good | Good | Good | Good | Good | Good |
| Evaluations of film | Paint film appearance | Good | Good | Good | Good | Good | Good | Good |
|  | Water resistance | Good | Good | Good | Good | Good | Good | Good |
|  | Total light transmittance (%) | 92.8 | 91.8 | 92 | 91.5 | 90.1 | 92.2 | 90.1 |
|  | Haze | 10 | 14 | 19 | 35 | 20 | 18 | 18 |
|  | Gas-barrier property | 2.1 | 0.95 | 0.38 | 0.24 | 0.39 | 0.26 | 0.09 |
| Gas-barrier property of film not containing clay mineral |  |  |  | 62 |  | 66 | 38 | 13 |

Unit of gas-barrier property is (mL/m$^2$ · day · atom).
Values are at paint film thickness of 5 µm.

TABLE 6

Formulations of Comparative Examples and evaluation results of resin films using same

|  |  | Comparative Example 2-1 | Comparative Example 2-2 |
|---|---|---|---|
| Solution | (1) Resin Synthesis Example No. of resin component | d | e |
|  | (2) Clay mineral-dispersed liquid | B1 | B1 |
|  | Mass ratio of (1)/(2) | 100/50 | 100/50 |
|  | Stability  1 month | Poor | Poor |
|  | 3 months | — | — |
|  | 6 months | — | — |
| Film | Paint film appearance | Poor | Poor |
|  | Water resistance | Good | Good |
|  | Total light transmittance (%) | 70 | 75 |
|  | Haze | 51 | 55 |
|  | Gas-barrier property | 18 | 5 |
| Gas-barrier property of film not containing clay mineral |  | 202 | 115 |

• Unit of gas-barrier property is (mL/m$^2$ · day · atom).
Values are at paint film thickness of 5 µm.

As it is clear from Table 5 that with the technique according to the present invention, an aqueous dispersion composition containing a clay mineral and a polyhydroxyurethane resin each dispersed uniformly therein can be obtained. Particularly, the aqueous dispersion composition has more excellent dispersion stability of the clay mineral than in the cases each using an aqueous polyhydroxyurethane resin dispersion of Comparative Example produced by a conventional formulation, and it is considered that this is attributable to the fact that the polyhydroxyurethane resins used in the present invention each contain a carboxyl group introduced in the structure thereof through an amide bond. That is, it is considered that it is hard for the polymer chain of a polyhydroxyurethane resin produced by a conventional method of making the polyhydroxyurethane resin hydrophilic with only a carboxyl group which is anionic to penetrate in the interlayers of a clay mineral, but in contrast, without an aggregate even though the paint films (coating film layers) utilized a clay mineral.

In addition, the amide bond is superior in hydrolysis resistance to the ester bond conventionally used in introducing a carboxyl group in a hydroxyurethane resin, and therefore the stability of the dispersed particles of the polymer was also favorable. Further, it was also ascertained that by forming a coating film using an aqueous dispersion composition according to the present invention containing a clay mineral and a polyhydroxyurethane resin each dispersed uniformly therein, a clay mineral-polyhydroxyurethane resin composite coating film can be simply obtained, and that the dispersion state of the clay mineral is favorable, and therefore a high gas-barrier property can be realized even though the film thickness is thin.

INDUSTRIAL APPLICABILITY

As described above, according to the first invention, an aqueous polyhydroxyurethane resin dispersion which can achieve long-term storage that is a requirement for industrial applications can be provided. A carboxyl group is introduced in the structure of a hydroxyurethane resin before being subjected to phase-transfer emulsification by addition of water in order to obtain a stable state of an aqueous dispersion, but a hydroxy group exists simultaneously, and therefore the coating film formed with the polyhydroxyurethane resin according to the first invention has mechanical strength which is similar to that of a coating film formed with a conventional polyhydroxyurethane resin and has a more excellent gas-barrier property than the gas-barrier property which has been conventionally obtained, so that practical applications to conventionally assumed uses can be expected. Further, carbon dioxide can be used as a raw material for the polyhydroxyurethane resin that characterizes the present invention, and therefore the polyhydroxyurethane resin that characterizes the present invention provides a technique that is also expected from the perspective of protection of the global environment.

According to the second invention, an aqueous polyhydroxyurethane resin-clay mineral dispersion composition which can achieve long-term storage that is a requirement for industrial applications can be provided. Further, a polyhydroxyurethane-clay mineral composite coating film can be simply formed using the aqueous dispersion composition, and this coating film can be used as a gas-barrier layer. In addition, the coating film which is formed has appearance without an aggregate and has gloss even though it utilizes a clay mineral, and therefore utilization in a wide range is expected. Further, carbon dioxide can be used as a raw material for the polyhydroxyurethane resin that characterizes the present invention, and therefore the polyhydroxyurethane resin that characterizes the present invention provides a technique that is also expected from the perspective of protection of the global environment.

The invention claimed is:

1. An aqueous polyhydroxyurethane resin dispersion being an aqueous dispersion comprising a polyhydroxyurethane resin having particle diameters in range from 0.001 μm to 10 μm dispersed in water, wherein
the polyhydroxyurethane resin comprises: a repeating unit represented by following formula (1) as a basic structure; and a carboxyl group-containing chemical structure moiety represented by following formula (6), in a structure of the polyhydroxyurethane resin:

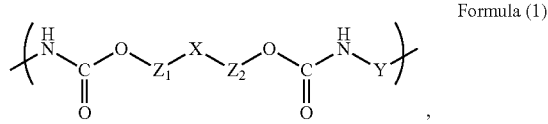

Formula (1)

wherein:
—X— represents a direct bond, an aliphatic hydrocarbon group having 1 to 30 carbon atoms, an alicyclic hydrocarbon group having 4 to 40 carbon atoms, or an aromatic hydrocarbon group having 6 to 40 carbon atoms, wherein in structures of these groups, any one bond selected from the group consisting of an ether bond, an amino bond, a sulfonyl bond, and an ester bond, or as a substituent, any one group selected from the group consisting of a hydroxy group, a halogen atom, and a polyalkylene glycol chain having a number of repeating units in a range from 1 to 30 each comprising 2 to 6 carbon atoms is optionally contained;
—Y— represents an aliphatic hydrocarbon group having 1 to 15 carbon atoms, an alicyclic hydrocarbon group having 4 to 15 carbon atoms, or an aromatic hydrocarbon group having 6 to 15 carbon atoms, wherein in structures of these groups, an ether bond or a sulfonyl bond, or as a substituent, any one group selected from the group consisting of a hydroxy group and a halogen atom is optionally contained;
—$Z_1$— and —$Z_2$— each independently represent at least one structure selected from the group consisting of following formula (2), formula (3), formula (4), and formula (5), and two or more of the structures selected from the group consisting of the formulas (2), (3), (4), and (5) are optionally mixed within the repeating units of the formula (1) and between the repeating units; and in any of cases where any one of the formulas (2), (3), (4), and (5) is independently selected for —$Z_1$— and —$Z_2$—, a bond on a right side bonds with an oxygen atom, and a bond on a left side bonds with X, and in a case where X represents a direct bond, the bond on the left side bonds with a bond on a left side of the other of the —$Z_1$— and the —$Z_2$—,

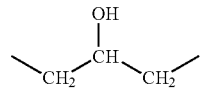

Formula (2)

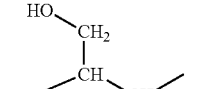

Formula (3)

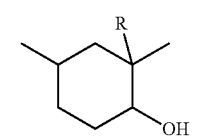

Formula (4)

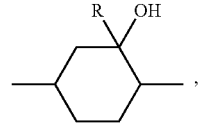

Formula (5)

wherein R in the formula (4) and in the formula (5) independently represents a hydrogen atom or a methyl group,

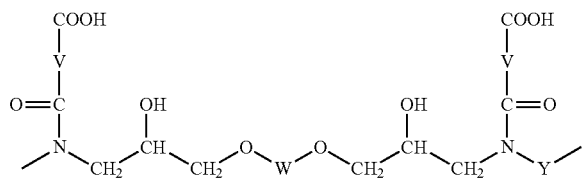

Formula (6)

wherein:
—W— represents an aliphatic hydrocarbon group having 1 to 30 carbon atoms, an alicyclic hydrocarbon group having 4 to 40 carbon atoms, or an aromatic hydrocarbon group having 6 to 40 carbon atoms, wherein in structures of these groups, any one bond selected from the group consisting of an ether bond, an amino bond, a sulfonyl bond, and an ester bond, or as a substituent, any one group selected from the group consisting of a hydroxy group, a halogen atom, and a polyalkylene glycol chain having a number of repeating units in a range from 1 to 30 each comprising 2 to 6 carbon atoms is optionally contained;
—Y— represents a part to be bonded with a urethane structure having a bond represented by formula (1) and is selected from the group consisting of the aliphatic hydrocarbon group, the alicyclic hydrocarbon group, and the aromatic hydrocarbon group, represented as —Y— in the formula (1); and
—V— represents a hydrocarbon group having 1 to 10 carbon atoms or an aromatic hydrocarbon group having 6 to 10 carbon atoms, wherein in structures of these groups, an oxygen atom or a nitrogen atom is optionally contained.

2. The aqueous polyhydroxyurethane resin dispersion according to claim 1,
wherein the polyhydroxyurethane resin has a weight average molecular weight in a range from 10000 to 100000, an acid value in a range from 15 mgKOH/g to 50 mgKOH/g, and a hydroxyl value in a range from 150 mgKOH/g to 250 mgKOH/g.

3. The aqueous polyhydroxyurethane resin dispersion according to claim 1,
wherein a basic structure part of the polyhydroxyurethane resin represented by the formula (1) comprises a polyaddition reaction product of a compound (i) having at least two pentacyclic carbonate structures and a compound (ii) having at least two primary amino groups, wherein at least part of the compound (i) is synthesized using carbon dioxide as a raw material; and
an —O—CO— bond derived from the carbon dioxide accounts for 1 to 30% by mass of a total mass of the polyhydroxyurethane resin.

4. A method for producing the aqueous polyhydroxyurethane resin dispersion according to claim 1, the method comprising:
polymerization by subjecting a compound having at least two epoxy groups and a compound having at least two pentacyclic carbonate structures to a polyaddition reaction with a compound having at least two primary amino groups in a hydrophilic solvent, thereby obtaining a polyhydroxyurethane resin containing a secondary amino group in a structure thereof;
an ionic group introduction by further reacting a cyclic acid anhydride with the secondary amino group, thereby obtaining a polyhydroxyurethane resin having in a structure thereof a carboxyl group to be an ionic group; and
performing phase-transfer emulsification by neutralizing the carboxyl group in the obtained polyhydroxyurethane resin and then adding water.

5. The method for producing the aqueous polyhydroxyurethane resin dispersion according to claim 4,
wherein in the polymerization, the compound having at least two epoxy groups is reacted with the compound having at least two primary amino groups under a condition where an amount of the primary amino group is excessive so that a primary amino group/epoxy group ratio is in a range of 4/1 or larger in terms of an equivalent ratio of the primary amino group relative to the epoxy group, thereby leaving the primary amino group unreacted, and thereafter the compound having at least two pentacyclic carbonate structures is subjected to the polyaddition reaction with the primary amino groups left unreacted.

6. A gas-barrier resin film comprising:
a base material; and
a coating film layer comprising a polyhydroxyurethane resin on at least one surface of the base material, wherein
the polyhydroxyurethane resin in the coating film layer is the polyhydroxyurethane resin present in the aqueous polyhydroxyurethane resin dispersion according to claim 1, and
the coating film layer has a thickness in a range from 0.1 to 100 μm and an oxygen transmission rate in a range of 50 mL/m²·day atm or less at 23° C. in a humidity of 65%.

7. A clay mineral-containing aqueous polyhydroxyurethane resin dispersion composition, the composition being an aqueous dispersion composition of a composite material comprising:
as an (A) component, an anionic polyhydroxyurethane resin having a carboxyl group and a hydroxy group; and
as a (B) component, a layered clay mineral, wherein
a total content of the (A) component and the (B) component is in a range from 10 to 50% by mass relative to the composition;
the (B) component is contained in a range from 1 to 100 parts by mass relative to 100 parts by mass of the (A) component; and
a chemical structure of the anionic polyhydroxyurethane resin having the carboxyl group and the hydroxy group comprises: a repeating unit represented by following formula (1) as a basic structure; and a carboxyl group-containing chemical structure moiety represented by following formula (6):

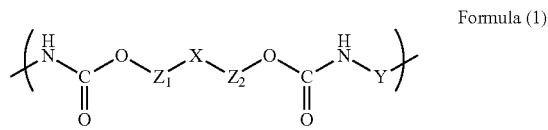

Formula (1)

wherein:
—X— represents a direct bond, an aliphatic hydrocarbon group having 1 to 30 carbon atoms, an alicyclic hydrocarbon group having 4 to 40 carbon atoms, or an aromatic hydrocarbon group having 6 to 40 carbon atoms, wherein in structures of these groups, any one bond selected from the group consisting of an ether bond, an amino bond, a sulfonyl bond, and an ester bond, or as a substituent, any one group selected from the group consisting of a hydroxy group, a halogen atom, and a polyalkylene glycol chain having a number of repeating units in a range from 1 to 30 each comprising 2 to 6 carbon atoms is optionally contained;

—Y— represents an aliphatic hydrocarbon group having 1 to 15 carbon atoms, an alicyclic hydrocarbon group having 4 to 15 carbon atoms, or an aromatic hydrocarbon group having 6 to 15 carbon atoms, wherein in structures of these groups, an ether bond or a sulfonyl bond, or as a substituent, any one group selected from the group consisting of a hydroxy group and a halogen atom is optionally contained;

—$Z_1$— and —$Z_2$— each independently represent at least structure selected from the group consisting of following formula (2), formula (3), formula (4), and formula (5), and two or more of the structures selected from the group consisting of the formulas (2), (3), (4), and (5) are optionally mixed within the repeating units of the formula (1) and between the repeating units; and in any of cases where any one of the formulas (2), (3), (4), and (5) is independently selected for —$Z_1$— and —$Z_2$—, a bond on a right side bonds with an oxygen atom, and a bond on a left side bonds with X, and in a case where X represents a direct bond, the bond on the left side bonds with a bond on a left side of the other of the —$Z_1$— and the —$Z_2$—, Formula (2)

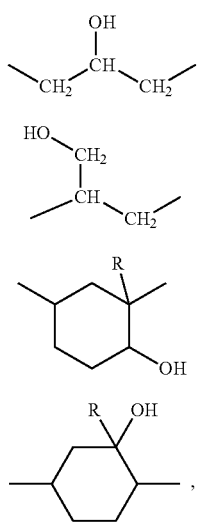

Formula (3)

Formula (4)

Formula (5)

wherein R in the formula (4) and in the formula (5) independently represents a hydrogen atom or a methyl group, Formula (6)

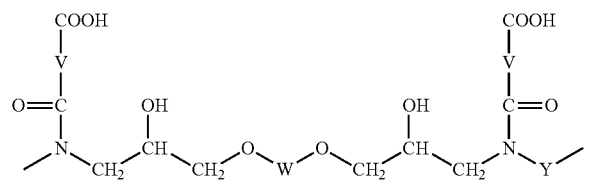

wherein:
- —W— represents an aliphatic hydrocarbon group having 1 to 30 carbon atoms, an alicyclic hydrocarbon group having 4 to 40 carbon atoms, or an aromatic hydrocarbon group having 6 to 40 carbon atoms, wherein in structures of these groups, any one bond selected from the group consisting of an ether bond, an amino bond, a sulfonyl bond, and an ester bond, or as a substituent, any one group selected from the group consisting of a hydroxy group, a halogen atom, and a polyalkylene glycol chain having a number of repeating units in a range from 1 to 30 each comprising 2 to 6 carbon atoms is optionally contained;
- —Y— represents a part to be bonded with a urethane structure having a bond represented by formula (1) and is selected from the group consisting of the aliphatic hydrocarbon group, the alicyclic hydrocarbon group, and the aromatic hydrocarbon, represented as —Y— in the formula (1); and
- —V— represents a hydrocarbon group having 1 to 10 carbon atoms or an aromatic hydrocarbon group having 6 to 10 carbon atoms, wherein in structures of these groups, an oxygen atom or a nitrogen atom is optionally contained.

8. The clay mineral-containing aqueous polyhydroxyurethane resin dispersion composition according to claim 7, wherein the anionic polyhydroxyurethane resin being the (A) component has a weight average molecular weight in a range from 10000 to 100000, an acid value in a range from 15 mgKOH/g to 50 mgKOH/g, and a hydroxyl value in a range from 150 mgKOH/g to 250 mgKOH/g.

9. The clay mineral-containing aqueous polyhydroxyurethane resin dispersion composition according to claim 7, wherein a basic structure part of the anionic polyhydroxyurethane resin as the (A) component, represented by the formula (1) comprises a polyaddition reaction product of a compound (i) having at least two pentacyclic carbonate structures and a compound (ii) having at least two primary amino groups, wherein at least part of the compound (i) is synthesized using carbon dioxide as a raw material; and
an —O—CO— bond derived from the carbon dioxide accounts for 1 to 30% by mass of a total mass of the anionic polyhydroxyurethane resin as the (A) component.

10. The clay mineral-containing aqueous polyhydroxyurethane resin dispersion composition according to claim 7, wherein the layered clay mineral as the (B) component, is at least one material selected from the group consisting of montmorillonite, saponite, hectorite, vermiculite, kaolinite, and mica.

11. A gas-barrier aqueous coating agent comprising the clay mineral-containing aqueous polyhydroxyurethane resin dispersion composition according to claim 7 as an essential component.

12. A gas-barrier resin film comprising:
a base material; and
a coating film layer provided on at least one surface of the base material and formed with a composite material comprising a polyhydroxyurethane resin and a clay mineral,
wherein the composite material is the clay mineral-containing aqueous polyhydroxyurethane resin dispersion composition according to claim 7, and
the coating film layer has a thickness in a range from 0.1 to 100 μm, and
the coating film layer has an oxygen transmission rate in a range from 10 mL/m²·day·atm or less at 23° C. in a humidity of 65%.

* * * * *